(12) United States Patent
Chung et al.

(10) Patent No.: US 8,013,024 B2
(45) Date of Patent: Sep. 6, 2011

(54) HIGH-PERFORMANCE INTERFACE MATERIALS FOR IMPROVING THERMAL CONTACTS

(75) Inventors: Deborah Duen Ling Chung, E. Amherst, NY (US); Chuangang Lin, Amherst, NY (US)

(73) Assignee: Deborah D. L. Chung, East Amherst, NY (US)

( * ) Notice: Subject to any disclaimer, the term of this patent is extended or adjusted under 35 U.S.C. 154(b) by 989 days.

(21) Appl. No.: 11/772,108

(22) Filed: Jun. 29, 2007

(65) Prior Publication Data

US 2009/0004389 A1 Jan. 1, 2009

(51) Int. Cl.
*C01B 33/18* (2006.01)
*C09K 5/00* (2006.01)

(52) U.S. Cl. ............................ 516/100; 252/71; 427/331

(58) Field of Classification Search .................. 516/100; 252/71; 427/331

See application file for complete search history.

(56) References Cited

U.S. PATENT DOCUMENTS

| | | |
|---|---|---|
| 6,475,962 B1 | 11/2002 | Khatri |
| 2003/0171487 A1 | 9/2003 | Ellsworth |
| 2004/0018945 A1 | 1/2004 | Khatri |
| 2004/0081843 A1 | 4/2004 | Bunyan |
| 2004/0241410 A1 | 12/2004 | Fischer |
| 2005/0150887 A1 | 7/2005 | Taya |
| 2005/0163813 A1 | 7/2005 | Kosbach |

FOREIGN PATENT DOCUMENTS

| | | |
|---|---|---|
| KR | 2002060926 | 7/2002 |
| KR | 2002061469 | 7/2002 |
| WO | WO 9823697 | 6/1998 |
| WO | WO 0057993 | 10/2000 |
| WO | WO 2004026766 | 4/2004 |
| WO | WO 2004048261 | 6/2004 |

OTHER PUBLICATIONS

Handbook of Fillers—A Definitive User's Guide and Databook (2nd Edition) By Wypych, George 2000 Chem Tec Publishing, p. 132.*
U.S. Appl. No. 11/427,150, filed 2006, Chung.
Y. Aoyagi and D.D.L. Chung, "Effects of antioxidants and the solid component on the thermal stability of polyol-ester-based . . . ", J. Materials Science, 2007, 42(7), 2358-2375.
S. Gaydardzhiev and P. Ay, "Characterization of aqueous suspensions of fumed aluminium oxide in presence of two dolapix . . . ", J. Materials Science, 2006, 41(16), 5257-5262.
V.M. Gun'ko, Zarko, Turov, Leboda, Chibowski, Pakhlov, Goncharuk, . . . , "Characterization of fumed alumina . . . ", J. Colloid and Interface Science, 1999, 220(2), 302-323.
Yangxing Li and Peter S. Fedkiw, "Rate capabilities of composite gel electrolytes containing fumed silica nanoparticles", J. Electrochemical Soc., 2006, 153(11), A2126-A2132.
John Boyle, ICA Manas-Zloczower and Donald L. Feke, "Influence of particle morphology and flow conditions on the dispersion . . . ", Part. Part. Syst. Charact. 2004, 21, 205-212.
Yunsheng Xu and D.D.L. Chung, "Increasing the thermal conductivity of boron nitride and aluminum nitride particle epoxy-matrix . . . ", Composite Interfaces, 2000, 7(4), 243-256.

* cited by examiner

*Primary Examiner* — Ling Choi
*Assistant Examiner* — Chun-Cheng Wang

(57) ABSTRACT

A conformable, spreadable, electrically nonconductive, thermally conductive, thermally stable and phase separation resistant paste substantially consisting of fumed oxide dispersed in a non-aqueous paste-forming vehicle is disclosed. The fumed oxide is preferably silane-treated. This invention also discloses a thermal contact enhancing interface material comprising the paste, which, upon compression between two solid surfaces, forms a material that enhances the thermal contact between the surfaces. In addition, a method of providing a thermal contact between two solid surfaces is disclosed. This method comprises disposing between and in contact with the surfaces a material comprising the paste and applying a pressure to cause the paste to conform to the topography of said surfaces.

20 Claims, 13 Drawing Sheets

HIGH-PERFORMANCE INTERFACE MATERIALS FOR IMPROVING THERMAL CONTACTS

FIELD OF THE INVENTION

This invention relates to high-performance interface materials for improving thermal contacts. In particular, it relates to pastes that are conformable, spreadable, electrically nonconductive, thermally conductive, thermally stable and phase separation resistant.

BACKGROUND OF THE INVENTION

A thermal contact enhancing interface material is a material that is positioned at the interface between two proximate surfaces for the purpose of improving the thermal contact between the two surfaces. This material is also known as a thermal interface material.

A fumed oxide is an oxide (e.g., a metal oxide) that has been produced through a gas-phase reaction, so that it is in the form of nanoparticles (size typically ranging from 5 nm to 500 nm (where nm=nanometer)) that are partly fused together to form a porous agglomerate. In contrast, a conventional oxide is not fumed, so that its particles are not fused together and are typically much larger than those in the range for nanoparticles. Throughout this document, oxides are not fumed, unless noted otherwise.

Due to the critical importance of microelectronics cooling to the reliability, performance and further miniaturization of computers and other microelectronic systems, the development of thermal interface materials is technologically important. Thermal interface materials are needed to improve thermal contacts, such as that between a microprocessor and a heat sink of a computer. As heat sinks improve, the bottleneck in the heat transfer shifts more and more to the thermal contact. This makes thermal interface materials increasingly important in the overall problem of thermal management in electronic systems.

The thicker is a thermal interface material, the higher is its thermal resistance in the direction of the thickness. Therefore, a small thickness is preferred. In order to attain a small thickness (ideally just enough to fill the valleys in the topography of the proximate surfaces), a thermal interface material is commonly in the form of a paste, which is known as a thermal paste. This paste comprises a base medium (i.e., the vehicle, which is a liquid) and a solid component (i.e., the filler). A small thickness can be attained if the paste is highly spreadable. Hence, spreadability is a preferred characteristic of a thermal paste.

A thermal paste displaces the air from the valleys of the topography of the proximate surfaces, which are never perfectly smooth. Since air is thermally insulating, this displacement results in an improved thermal contact. The ability to displace air hinges on the conformability of the thermal paste, i.e., the thermal paste needs to conform to the topography of the proximate surfaces. Since the topography is frequently in the micrometer scale (even finer than the micrometer scale), the paste needs to be able to fill valleys in a fine scale.

The solid component (also known as the filler) in a thermal paste is typically in the form of particles. The particles should be sufficiently small in size in order to fill the small valleys in the surface topography. Thus, nanoparticles are attractive for formulating thermal pastes.

It is preferable that a thermal paste is conductive thermally. The greater is the thickness of a thermal interface material, the more important is the thermal conductivity of the interface material. However, in case of a small thickness for the interface material, thermal conductivity is not very important, as long as it exceeds that of the air that it displaces.

The solid component is preferably nonconductive electrically. This is because of the possibility of seepage of the thermal paste from the thermal interface during transportation or use of the electronics. Seepage may cause contamination and, in case that the thermal paste is electrically conductive, it may cause undesirable electrical shortage as well.

A thermal interface material must withstand the elevated temperatures associated with the hotter of the two proximate surfaces that sandwich the interface material during use. In microelectronics, the elevated temperature is usually up to 100° C., although, in some applications, it can be up to 150° C. Therefore, thermal stability is another requirement of a thermal interface material.

After sitting for a sufficiently long time, a paste may undergo phase separation, i.e., the separation of the solid component of the paste from the vehicle. In most cases, the solid component tends to sink, due to gravity. Phase separation is not desirable. Therefore, a low tendency for phase separation is another attribute that is needed for a thermal paste.

Conformability, spreadability, electrical nonconductivity, thermal conductivity, thermal stability and phase separation resistance are attributes that are important for a high-performance thermal interface material. Inadequacy in any of these attributes will undermine the performance of a thermal interface material.

Thermal interface material of the prior art are commonly disadvantageous in their poor conformability and/or electrical conductivity. For example, silver pastes in the prior art (e.g., Arctic Silver 5, a product of Arctic Silver, Inc., Visalia, Calif.) are disadvantageous in both poor conformability (due to the high volume fraction of silver particles in the paste) and electrical conductivity (due to the high electrical conductivity of silver); carbon black pastes in the prior art (U.S. patent application Ser. No. 11/427,150 (2006), which is hereby incorporated by reference in its entirety) are disadvantageous in the electrical conductivity (due to the moderate electrical conductivity of carbon black), though they are highly conformable (due to the squishability or extensive compressibility of carbon black); ceramic (e.g., boron nitride) pastes in the prior art (e.g., Ceramique, a product of Arctic Silver, Inc., Visalia, Calif.) are disadvantageous in the poor conformability (due to the high volume fraction of ceramic particles in the paste), though they are electrically nonconductive (due to the electrical nonconductivity of ceramics).

The combination of thermal conductivity and electrical non-conductivity is not exhibited by most conductive materials. For example, metals and graphite are both electrically and thermally conductive. In contrast, polymers (other than those that have been specially doped) are nonconductive both electrically and thermally.

Diamond is particularly attractive in its combination of exceptionally high thermal conductivity and electrical non-conductivity, but it is expensive. Ceramics such as boron nitride (BN), zinc oxide (ZnO) and alumina (i.e., aluminum oxide, $Al_2O_3$) are not as thermally conductive as diamond, but they are thermally conductive to various degrees and are all electrically nonconductive, and are much less expensive than diamond. Among boron nitride, zinc oxide and alumina, boron nitride is the most conductive thermally, though it is the most expensive. Boron nitride is used as a thermally conductive constituent in thermal interface materials (U.S. 20040241410 (2004) and U.S. 20040081843 (2004), which are hereby incorporated by reference in their entirety). Compared to boron nitride, zinc oxide is less thermally conductive, but it is less expensive. Zinc oxide is the thermally conductive constituent of choice in the thermal interface material formulation in U.S. 6475962 (2002), which is hereby incorporated by reference in its entirety. Alumina is even less conductive thermally than zinc oxide, so it is not considered to be attractive for use in thermal interface materials.

The thermal conductivity within a thermal interface material should be distinguished from the thermal contact conductance across the thermal contact. It is the latter that describes the effectiveness of a thermal paste. Measurement of the latter requires measurement of the thermal resistance of the sandwich that consists of the two proximate surfaces and the thermal interface material between them. The sandwich includes the thermal interface material, the interface between the thermal interface material and one of the two proximate surfaces, and the interface between the thermal interface material and the other proximate surface.

Fumed oxides include zinc oxide, aluminum oxide, titanium dioxide, silicon dioxide, etc. Most fumed oxides are fumed metal oxides. Fumed oxides are formed by gas-phase reactions. An example of a method of producing a fumed oxide involves injecting a stream of a liquid feedstock containing a volatilizable oxide precursor into a stream of a combustion gas, with the temperature above the solidification temperature of the oxide particles (PCT Int. Appl. WO 2004048261 (2004), which is hereby incorporated by reference in its entirety). Among these oxides, zinc oxide is particularly attractive for its relatively high thermal conductivity.

Fumed oxides are used for (i) cosmetics that serve to disguise skin imperfections (U.S. Pat. Appl. US 2005163813 (2005), which is hereby incorporated by reference in its entirety), (ii) recording media with improved ozone resistance (PCT Int. Appl. WO 2004026766 (2004), which is hereby incorporated by reference in its entirety), (iii) catalytic converters for treating internal combustion engine exhaust (PCT Int. Appl. WO 2000057993 (2000), which is hereby incorporated by reference in its entirety), and (iv) abrasives for mechanical polishing (PCT Int. Appl. WO 9823697 (1998), which is hereby incorporated by reference in its entirety).

Fumed oxides such as fumed alumina have been previously disclosed for use as a minor solid additive (1-5 wt. %) in a thermally conductive paste that contains 60-90 wt. % of a highly conductive powder (such as silver, which is more conductive than alumina by orders of magnitude) (J. H. Mun and I. C. Sim, Republ. Korean Kongkae Taeho Kongbo KR 2002060926 (2002), which is hereby incorporated by reference in its entirety). Fumed oxides such as fumed alumina have also been disclosed for use as a minor solid additive (0.1-5.0%) in an electrically conductive paste that contains 15-60% of a highly conductive powder (such as silver) (B. M. Kim, Republ. Korean Kongkae Taeho Kongbo KR 2002061469 (2002), which is hereby incorporated by reference in its entirety). In the paste of Mun and Sim and the paste of Kim, the highly conductive powder (such as silver) is the major solid component and is the component that is responsible for the conductivity of the paste; the fumed oxide is not the component that is responsible for the conductivity of the paste. Fumed oxides have not been previously disclosed for use as the major conductive component in a conductive paste. Furthermore, no paste involving any fumed oxide in any proportion has been previously disclosed for use as a thermal interface material.

The conformability of a thermal paste depends not only on the solid component, but also on the vehicle, i.e., the matrix. A stiff matrix will result in poor conformability. Silicone is a soft and resilient matrix that is widely used for thermal interface materials. In spite of its softness and resilience, silicone exhibits high viscosity. Associated with the high viscosity is inadequacy in both conformability and spreadability. For example, U.S. Pat. Appl. Publ. US 20030171487 (2003) (which is hereby incorporated by reference in its entirety) uses silicone and recognizes the high viscosity of the resulting thermal interface material. U.S. Pat. Appl. Publ. US 20050150887 (2005) (which is hereby incorporated by reference in its entirety) also use silicone as the matrix.

During use, it is preferred that a thermal paste does not seep out of the interface, as the seepage can cause contamination and, in the case of an electrically conductive paste, short circuiting of the electronics around the thermal contact. Therefore, a thixotropic paste (a paste that flows only under an applied stress) is preferred to a fluidic paste (a paste that flows even in the absence of an applied stress). Silicone is thixotropic. Polyol ester can also be used to form a thixotropic paste, as described in U.S. Pat. No. 6,475,962 (2002) and U.S. Pat. Appl. Publ. US 20040018945 (2004), which are hereby incorporated by reference in their entirety.

The thermal stability of a paste is mostly governed by that of the vehicle, which is itself less thermally stable than the solid component. The choice and modification of the vehicle are typically used to improve the thermal stability of a paste. For example, the addition of one or more antioxidants to polyol ester can improve the thermal stability (Yasuhiro Aoyagi and D. D. L. Chung, "Effects of Antioxidants and the Solid Component on the Thermal Stability of Polyol-Ester-Based Thermal Pastes", *Journal of Materials Science* 42(7), 2358-2375 (2007), which is hereby incorporated by reference in its entirety).

A paste is a suspension, which is a dispersion of fine particles in a liquid medium. The particles should be uniformly distributed, with little tendency of sinking or floating. The liquid may be aqueous (water-based) or non-aqueous. In this context, non-aqueous liquids include organic compounds and organometallic compounds, but do not include inorganic compounds. The type of liquid medium affects the ability to form a suspension, as different liquids interact with the solid particles differently. In addition, the chemistry of the solid surface affects the ability to form a suspension, as this chemistry affects the interaction of the solid with the liquid.

Aqueous suspensions are disadvantageous in the tendency for the water in the suspension to evaporate. Therefore, non-aqueous suspensions (i.e., suspensions that are not based on water) are attractive for applications in which the suspension needs to continue to exist for an extended period of time without the need for replenishment. In addition, water tends to promote corrosion, particularly the corrosion of metals. Examples of non-aqueous vehicles include oils (e.g., mineral oil), polyols (e.g., polyethylene glycol), polyol esters (e.g., dipentaerythritol, pentaerythritol and trimethylolpropane esters) and polysiloxanes (e.g., poly(dimethylsiloxane) and poly(diphenylsiloxane)).

A polyol (also known as polyhydric alcohol) is an alcohol having numerous hydroxyl groups. Polyols include polyethers, glycols, polyglycols, polyesters and polyglycerols. They constitute a class of organic materials that vary substantially in molecular shape, molecular length and melting temperature, thus providing choices that can suit the requirements of thermal interface materials.

Polyol esters are neopentyl polyol esters that are made by reacting monobasic fatty acids with polyhedric alcohols having a neopentyl structure. The neopentyl structure of polyol alcohols molecules is unique in that there are no hydrogens on the beta-carbon. As a result, polyol esters are usually characterized by relatively high polarity, relatively low volatility and relatively high lubricity, thus making them attractive for high temperature applications. Polyol esters are mainly used for jet engine lubricants and passenger car motor oils.

Polysiloxanes are polymerized siloxanes. Siloxanes are a class of organosilicon compounds with the empirical formula $R_2SiO$, where R is an organic group.

Aqueous suspensions of fumed oxides are relevant to applications such as recording media and mechanical polishing. The art of making such suspensions has been reported (S. Gaydardzhiev and P. Ay, "Characterization of Aqueous Suspensions of Fumed Aluminium Oxide in Presence of Two Dolapix Dispersants", *Journal of Materials Science* 41(16), 5257-5262 (2006); V. M. Gun'ko, V. I. Zarko, V. V. Turov, R. Leboda, E. Chibowski, E. M. Pakhlov, E. V. Goncharuk, M. Marciniak, E. F. Voronin and A. A. Chuiko, "Characterization of Fumed Alumina/Silica/Titania in the Gas Phase and in Aqueous Suspension", *Journal of Colloid and Interface Science* 220(2), 302-323 (1999), which are hereby incorporated by reference in their entirety).

Applications other than those related to battery electrolytes have not been disclosed in relation to non-aqueous suspensions of fumed oxides. Non-aqueous suspensions in the form of gels of fumed silica in poly(ethylene glycol)dimethylether have been disclosed in relation to battery electrolyte applications (Yangxing Li and Peter S. Fedkiw, Rate Capabilities of Composite Gel Electrolytes Containing Fumed Silica Nanoparticles", *Journal of Electrochemical Society* 153(11), A2126-A2132 (2006), which is hereby incorporated by reference in its entirety). Study of non-aqueous suspensions of fumed silica in poly(dimethyl siloxane) has been disclosed without consideration of any application (John Boyle, Ica Manas-Zloczower and Donald L. Feke, "Influence of Particle Morphology and Flow Conditions on the Dispersion Behavior of Fumed Silica in Silicone Polymers", *Part. Part. Syst. Charact.* 21, 205-212 (2004), which is hereby incorporated by reference in its entirety).

The ability of the vehicle to wet the surface of the solid component in a paste is important for the dispersion of the solid particles in the vehicle and for the stability of the paste. Poor stability of a suspension means a substantial tendency for the solid particles in the suspension to separate from the vehicle. This separation is known as "phase separation". An example of phase separation is the sinking of the particles in the paste, as in the case in which the particles have a higher density than the vehicle. Wetting means the ability of the vehicle to spread on the surface of the solid component. Poor wetting can result in the balling up of the vehicle on the solid component. The wettability depends on the energy of the interface between the solid component and the vehicle. A low energy is desirable for wettability.

Phase separation tends to occur in suspensions to various degrees. In other words, different suspensions can have different degrees of resistance to phase separation. A suspension with a lower resistance to phase separation will take a shorter time for the start of observable phase separation than a suspension with a high resistance to phase separation. Phase separation tends to occur with relatively high propensity when the surface of the solid component is not sufficiently wetted by the vehicle in the paste. Thus, wettability enhancement is typically used to improve the phase separation resistance.

The surface of oxides tends to exhibit inadequate wettability with organic vehicles, due to the hydrophilic nature of most oxides. In contrast, due to the hydrophobic character of carbon, carbon black tends to have good wettability with organic vehicles.

Appropriate treatment of the surface of a solid component may be useful for improving the wettability. For example, such a treatment provides certain functional groups to the surface of the solid component, thereby modifying the chemical behavior of the surface. The treatment of boron nitride with silane has been disclosed in relation to the preparation of an epoxy-matrix composite solid containing 44-57 vol. % boron nitride particles of particle size 5-11 μm (Yunsheng Xu and D. D. L. Chung, "Increasing the Thermal Conductivity of Boron Nitride and Aluminum Nitride Particle Epoxy-Matrix Composites by Particle Surface Treatment", *Composite Interfaces* 7(4), 243-256 (2000), which is hereby incorporated by reference in its entirety). This treatment involves coating the boron nitride particles with a thin layer of silane. It is effective for improving the interface between the boron nitride particles and the epoxy matrix, so that the thermal conductivity of the resulting composite is increased. This composite is a monolithic solid; it is not a suspension.

A silane is a silicon analogue of an alkane hydrocarbon. It consists of a chain of silicon atoms covalently bound to hydrogen atoms. The general formula of a silane is $Si_nH_{2n+2}$. Silanes are used as coupling agents. An example of an application is the use of silane to improve the adhesion of glass fibers with a polymer matrix in the fabrication of a glass fiber polymer-matrix composite.

Metal alloys with low melting temperatures (such as solders) applied in the molten state have long been used as thermal interface materials. However, they tend to suffer from the chemical reactivity of the liquid alloy with some metal surfaces (such as copper, which is commonly used as a heat sink material). Furthermore, alloys suffer from the need to be applied in the molten state and the need to heat in order to attain melting. In contrast, thermal pastes typically do not require heating.

The present invention is directed to overcoming these and other deficiencies in the art.

SUMMARY OF THE INVENTION

This invention relates to high-performance thermal pastes that exhibit conformability, spreadability, electrical nonconductivity, thermal conductivity, thermal stability and phase separation resistance.

The thermal paste of this invention comprises fumed oxide. The conformability and phase separation resistance of the paste are due to the fact that the fumed oxide is in the form of nanoparticles that have been partly fused together to form porous agglomerates.

One aspect of the present invention relates to a conformable, spreadable, electrically nonconductive, thermally conductive, thermally stable and phase separation resistant paste substantially consisting of fumed oxide dispersed in a non-aqueous paste-forming vehicle.

Another aspect of the present invention relates to a conformable, spreadable, thermally conductive, electrically nonconductive, thermally stable and phase separation resistant paste comprising fumed oxide dispersed in a paste-forming vehicle, wherein the paste, upon compression between two solid surfaces, forms an interface material that enhances the thermal contact.

A further aspect of the present invention is a method of improving the thermal contact between two solid surfaces. Said method involves disposing a layer of a thermal contact enhancing interface material made in accordance with the present invention between and in contact with the two surfaces.

A still further aspect of this invention is that the use of a fumed oxide in place of the corresponding non-fumed oxide in a paste improves the phase separation resistance of the paste.

A still further aspect of this invention is that fumed oxides are more effective than the corresponding non-fumed oxides for providing thermal pastes for improving thermal contacts.

A still further aspect of this invention is that silane-treated fumed oxides are more effective than the corresponding unmodified fumed oxides (i.e., fumed oxides without silane treatment) for providing thermal pastes for improving thermal contacts. This relates to the fact that the silane treatment decreases the viscosity of the paste.

A still further aspect of this invention is that fumed oxides with silane treatment are as effective as carbon black in relation to improving thermal contacts. Compared to carbon black, which is electrically conductive, they are advantageous in their electrical nonconductivity.

A still further aspect of this invention is that the use of either about 4 vol. % silane-treated fumed zinc oxide or about 2 vol. % silane-treated fumed alumina gives a thermal paste that is highly effective for improving thermal contacts. They are more effective than commercial thermal pastes (Ceramique and Shin-Etsu) for improving thermal contacts.

A still further aspect of this invention is that fumed zinc oxide with silane treatment, fumed zinc oxide without silane treatment, and fumed alumina with silane treatment, all improve the thermal stability of the thermal paste, when any of them is present in the paste. Specifically, they improve the thermal stability of the vehicle portion of the paste. Among these, fumed zinc oxide with silane treatment is most effective, fumed zinc oxide without silane treatment is the second most effective, and fumed alumina with silane treatment is least effective.

A still further aspect of this invention is that fumed zinc oxide is superior to non-fumed zinc oxide in providing thermal pastes that exhibit high thermal stability.

A still further aspect of this invention is that the vehicle in the thermal paste is non-aqueous. Examples are polyol esters, polyols and polysiloxanes. Conformability, spreadability and thermal stability are the main criteria that govern the choice of the vehicle.

A still further aspect of this invention is that the solid component content in the thermal paste is preferably below 10 vol. %. An excessive amount is not suitable, due to the associated decreases in both conformability and spreadability.

Thermal contact enhancing interface materials of the present invention can be used to improve the thermal contact between a heat source and a heat sink. They can also be used to improve the thermal contact between a cold source and an object proximate the cold source, for the purpose of cooling the object or other objects connected to the object. The pastes may, for example, be applied to improve the thermal contact between a fluid-cooled object (the cold source) and a cold plate or a cold finger, for the purpose of cooling an object connected to the cold plate or cold finger.

DETAILED DESCRIPTION OF THE INVENTION

Figure 1A:
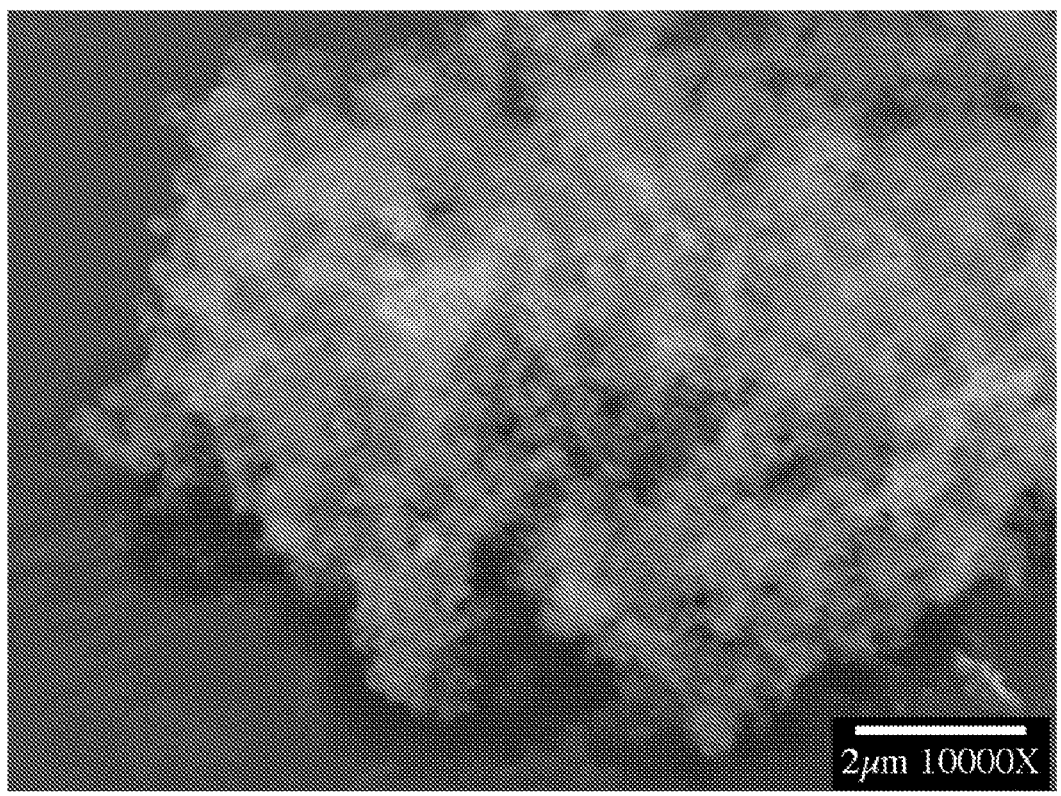
FIG. 1 shows scanning electron microscope (SEM) photographs of the solid components investigated. These photographs were obtained on these materials in the absence of a vehicle. (a) Fumed alumina 1. (b) Fumed alumina 2. (c) Fumed alumina 2 with silane coating. (d) Non-fumed alumina 1. (e) Fumed zinc oxide. (f) Fumed zinc oxide with silane coating. (g) Non-fumed zinc oxide 1. (h) Non-fumed zinc oxide 2. The meaning of the above designations is shown in Table 1.
Figure 1B:
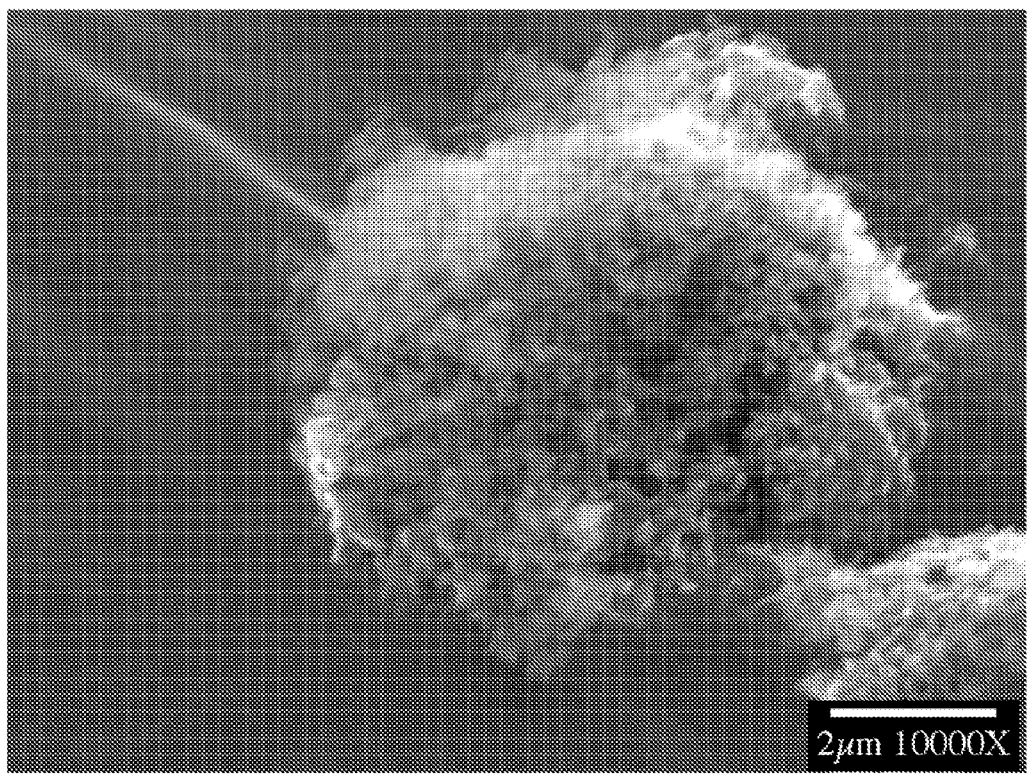
Figure 1C:
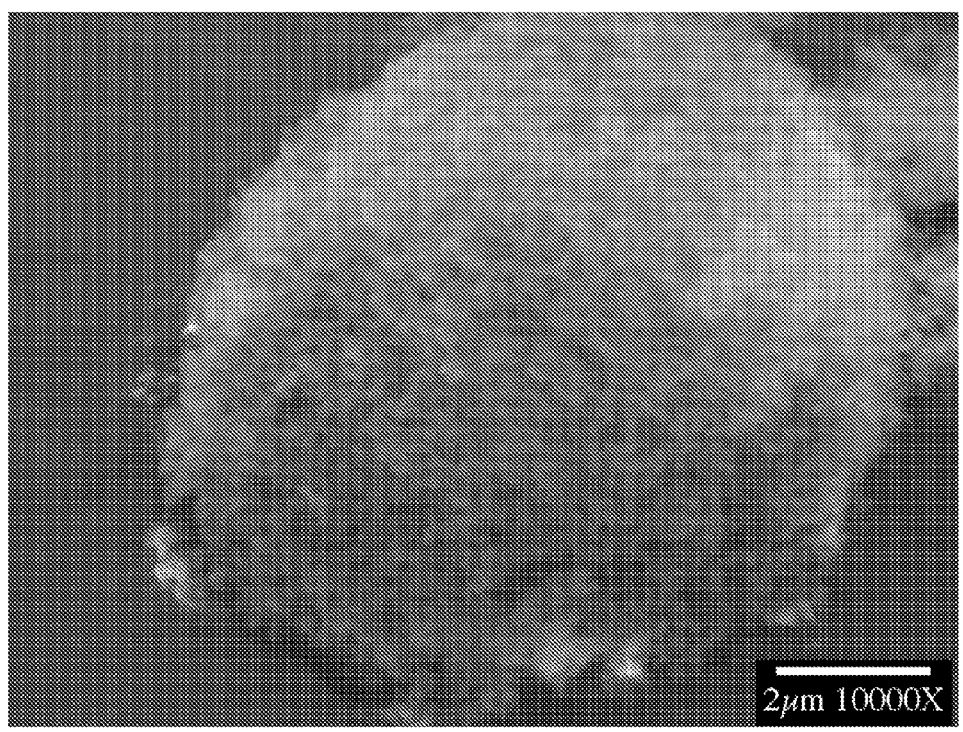
Figure 1D:
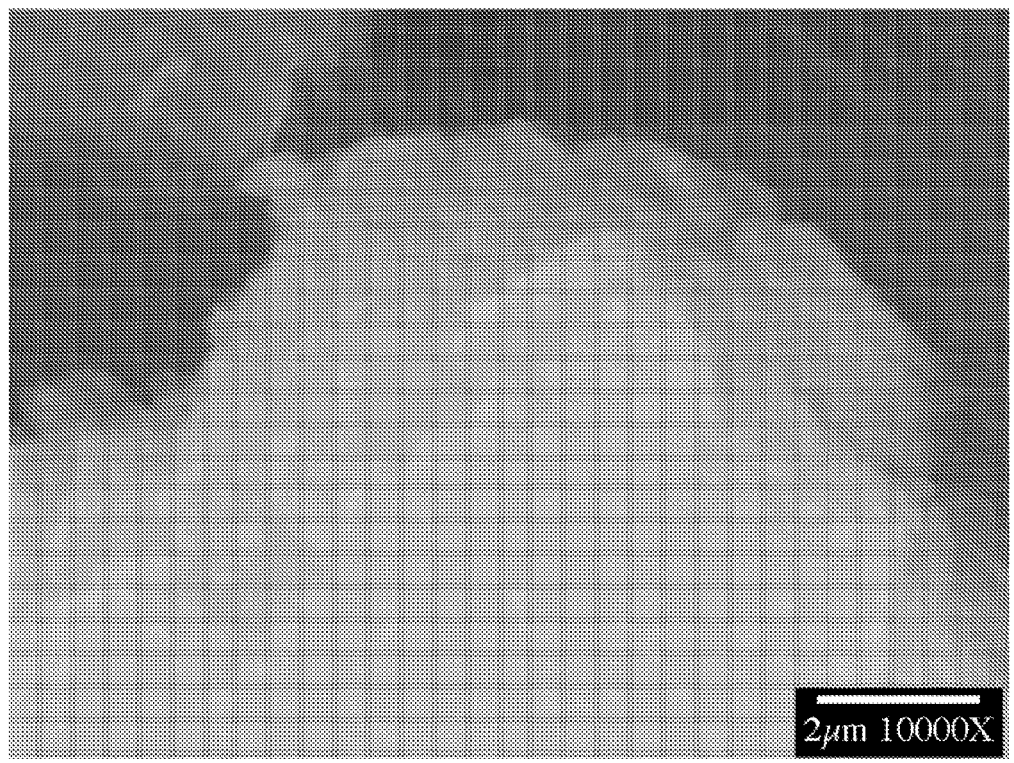
Figure 1E:
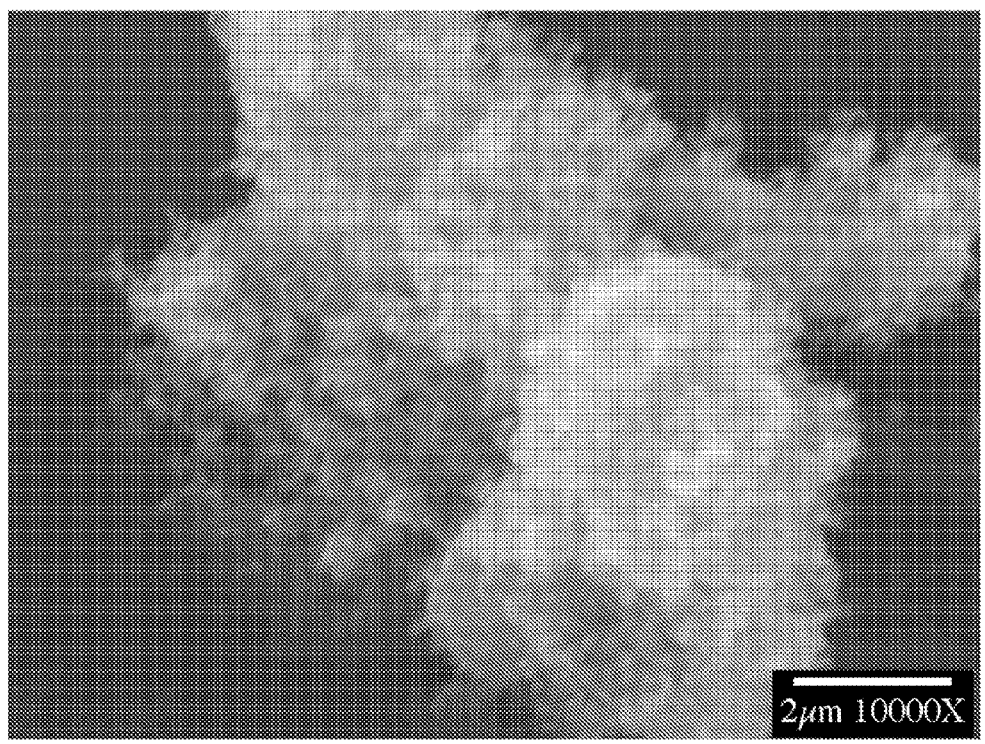
Figure 1F:
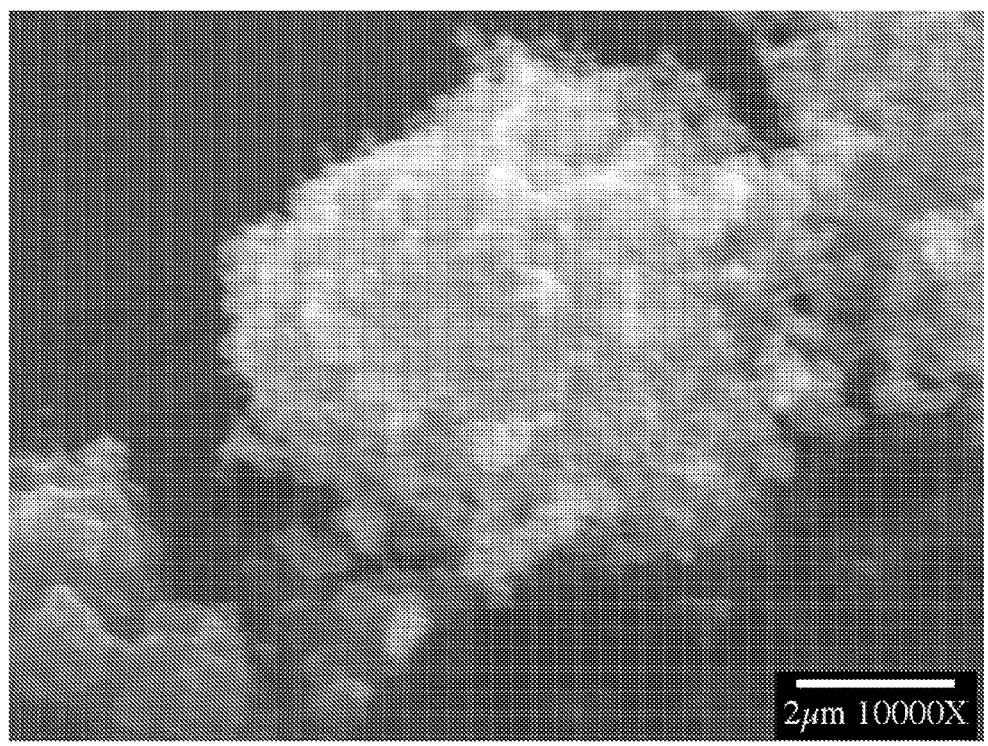
Figure 1G:
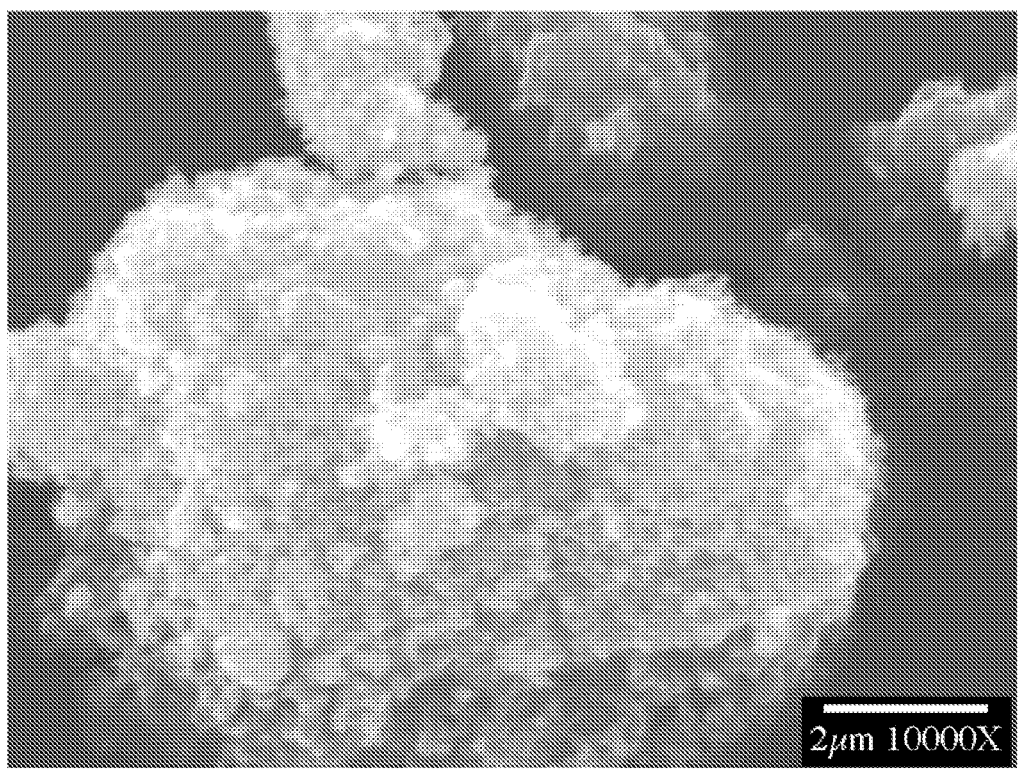
Figure 1H:
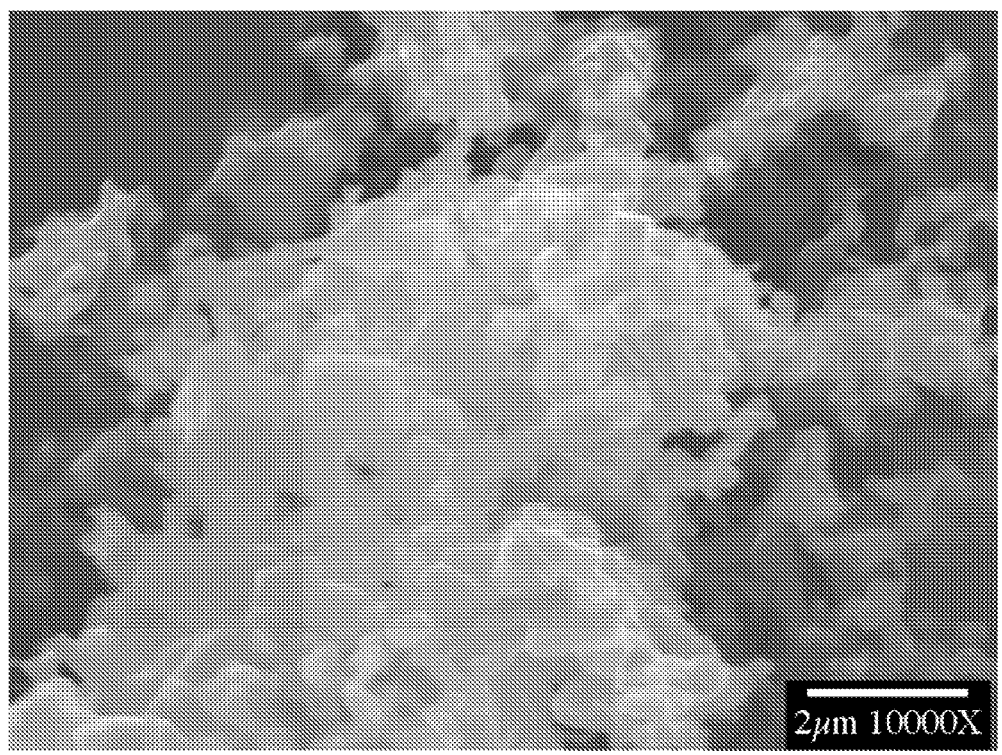

The present invention relates to conformable, spreadable, electrically nonconductive, thermally conductive, thermally stable and phase separation resistant paste substantially consisting of fumed oxide dispersed in a non-aqueous paste-forming vehicle.

The present invention also relates to a thermal contact enhancing interface material comprising: a conformable, spreadable, electrically nonconductive, thermally conductive, thermally stable and phase separation resistant paste comprising fumed oxide dispersed in a paste-forming vehicle, wherein the paste, upon compression between two solid surfaces, forms a material that enhances the thermal contact between the two surfaces.

Types of fumed oxide include fumed zinc oxide, fumed alumina, fumed silica, fumed titanium oxide, fumed magnesium oxide, fumed nickel oxide, fumed copper oxide, fumed iron oxide, fumed cobalt oxide, fumed chromium oxide, fumed manganese oxide, fumed calcium oxide, fumed strontium oxide, fumed barium oxide, fumed germanium oxide and fumed tin oxide.

Fumed zinc oxide is the most preferred type of fumed oxide for formulating a thermal paste. It is a crystalline solid exhibiting the wurtzite structure, just as the naturally occurring mineral zincite. In this crystal structure, the zinc atom is surrounded tetrahedrally by four oxygen atoms. In general, the smallest units of this type of material, visible with the electron microscope, are the primary particles of size of the order of 100 nm or less. The primary particles are joined to each other to form aggregates, which further loosely connect to form agglomerates of size up to about 1 mm. The zinc oxide content preferably exceeds 99%.

Fumed alumina is also a preferred type of fumed oxide for formulating a thermal paste. It has an average particle size that is preferably less than about 30 nm and $Al_2O_3$ content preferably at least about 95 wt. %.

The present invention shows that the use of a fumed oxide in place of the corresponding non-fumed oxide in a paste improves the phase separation resistance of the paste. It also improves the performance of the paste as a thermal interface material.

The fumed oxide is preferably treated with silane. Examples of silane are octylsilane ($C_{18}H_{17}SiH_3$) and tri-methoxyoctylsilane [$(CH_3O)_3$—Si—$C_8H_{17}$]. The treatment involves coating the fumed oxide with a thin layer of silane, which serves to render the surface of the fumed oxide hydrophobic. The coating process is preferably conducted prior to incorporation of the fumed oxide in the paste. An example of a coating process involves (i) immersion of the fumed oxide in a solution of silane in water, (ii) stirring, (iii) heating at a temperature in the range from 50 to 90° C. (e.g., 70° C.), (iv) rinsing with water, (v) filtration and (vi) drying at a temperature above 100° C. (e.g., 110° C.).

The present invention shows that treating a fumed oxide with silane helps to improve the thermal stability of the paste comprising the fumed oxide and a non-aqueous vehicle. It also improves the performance of the paste as a thermal interface material.

The amount of fumed oxide dispersed in the paste is preferably less than about 10 vol. %; it is most preferably less than about 4 vol. %.

A particularly useful thermal contact enhancing paste of the present invention includes silane-treated fumed zinc oxide dispersed in a paste-forming vehicle, where the amount of silane-treated fumed zinc oxide dispersed in the paste is about 4 vol. %, preferably about 4.0 vol. %.

Another particularly useful thermal contact enhancing paste of the present invention includes silane-treated fumed alumina dispersed in a paste-forming vehicle, where the amount of silane-treated fumed alumina dispersed in the paste is about 2 vol. %, preferably about 2.4 vol. %.

The fumed oxide comprises particles of particle size preferably less than about 500 nm, most preferably less than 50 nm.

The two solid surfaces mentioned in Paragraph 59 are compressed at a pressure preferably less than about 5 MPa, most preferably less than about 1 MPa. In microelectronic applications, the pressure is usually below 1 MPa.

The paste-forming vehicle is chosen from the group: polyol esters, polyols, polysiloxanes. It preferably comprises polyol esters.

Although the thermal conductivity of a thermal paste increases with the conductive solid content, the conformability of the paste decreases with increasing solid content beyond a certain level. In other words, an excessive solid content is detrimental to the conformability of the paste, though it helps the thermal conductivity within the paste. Therefore, the solid content needs to be optimized in order to attain a compromise between thermal conductivity and conformability.

Yet another particularly useful thermal contact enhancing paste of the present invention includes fumed oxide dispersed in a paste-forming vehicle that includes polyol ester, where the amount of fumed oxide dispersed in the paste is less than about 10 vol. %, preferably in the range from about 2 vol. % to about 4 vol. %.

The two surfaces mentioned in Paragraph 59 can be, for example, the proximate surfaces of a heat source and a heat sink, or those of a cold source and an object. A particularly important application that is directed at the dissipation of heat from an electronic apparatus involves the two surfaces being the proximate surfaces of an integrated circuit chip and a heat sink. For any application, during use, the two surfaces are at different temperatures and heat flows from the surface at a higher temperature to the other surface across the interface between the two surfaces.

The present invention is further directed at a method of providing a thermal contact between two solid surfaces, said method comprising disposing between and in contact with said surfaces a material comprising: a conformable, spreadable, electrically nonconductive, thermally conductive, thermally stable and phase separation resistant paste comprising fumed oxide dispersed in a paste-forming vehicle, and applying a pressure to cause said material to conform to the topography of said surfaces. The two surfaces can, for example, be the proximate surfaces of a heat source and a heat sink. Said paste, when compressed between said solid surfaces, is preferably of thickness less than about 100 μm; most preferably, the thickness is less than about 50 μm. Said pressure is preferably less than about 5 MPa; most preferably, it is less than about 1 MPa. Each of the agglomerates comprises oxide particles of particle size preferably less than about 500 nm; most preferably, the particle size is less than about 100 nm.

The abovementioned method is particularly useful for removing heat from a heat source, as needed for aiding the dissipation of heat from a microelectronic device or apparatus. In this context, the method involves providing a heat sink proximate the heat source and disposing a layer of a thermal contact enhancing material of the present invention between and in contact with the heat source and the heat sink.

The examples that follow are focused on the formulation and performance of thermal contact enhancing interface materials. In particular, they address the addition of various thermally conductive solid components to a non-aqueous vehicle for the purpose of providing a thermal paste which is conformable, spreadable, electrically nonconductive, thermally conductive, thermally stable and phase separation resistant and which provides an effective thermal interface material. The solid components evaluated include oxides with and without fuming, and fumed oxides with and without silane treatment. These oxides include zinc oxide, alumina and titanium oxide. The examples include a comparative study of pastes comprising various solid components.

For surfaces encountered in practical applications, such as the surfaces of heat sinks and microprocessors, the roughness is typically much higher than the submicron level. The need for the thermal paste to fill relatively deep valleys in the surface topography would make the thermal conductivity within the paste more important than when the valleys are shallow. Therefore, the relative performance of the pastes may be different for rough proximate surfaces compared to smooth proximate surfaces. The examples are partly directed at describing this difference, if any.

The examples include performance data for both smooth and rough proximate surfaces for the sake of comparison. The smooth surfaces were obtained by mechanical polishing using 0.05 μm alumina particles; the rough surfaces were obtained by mechanical polishing using 600 grit silicon carbide sand paper (with 15 μm silicon carbide particles).

The examples also compare the performance of the pastes of the present invention with that of selected commercial thermal pastes that are recognized by the microelectronic industry to be the most effective. The selected commercial products are (i) Arctic Silver, Inc. (manufacturer), Visalia, Calif., product known as Ceramique (density 2.7-2.8 g/ml;

oils with aluminum oxide, boron nitride and zinc oxide submicron particles, but without metal particles), (ii) Shin-Etsu MicroSi, Inc. (manufacturer), Phoenix, Ariz., product X-23-7762 (aluminum particle filled silicone with density 2.6 g/ml and thermal conductivity 6.0 W/m·K).

The examples also include comparison with the performance of the carbon black paste of the prior art (U.S. patent application Ser. No. 11/427,150 (2006)).

The comparative evaluation pertains to the effectiveness of the thermal interface material for improving thermal contacts, the thermal stability, the phase separation tendency and the viscosity, as these attributes are relevant to the thermal interface material application. In particular, evaluation of the effectiveness of the thermal interface material is conducted by measuring the thermal contact conductance across two copper proximate surfaces with a controlled surface roughness.

EXAMPLES

Example 1

Preparation of Paste Formulations

This example addresses the formulation of thermal pastes that contain a fumed oxide as the thermally conductive component. Pastes containing different types of oxides at various volume fractions are prepared for the sake of a comparative evaluation.

The materials in this study are listed in Table 1. They include fumed and non-fumed oxides, silane-treated fumed oxides, and carbon black.

The fumed oxides studied are zinc oxide, alumina and titanium dioxide. One form of fumed zinc oxide used is product VP AdNano Z805 from Degussa AG (Hanau, Germany). It is hereby referred to as "fumed zinc oxide with silane coating". It is a zinc oxide that has been treated by the manufacturer with an octylsilanized hydrophobic surface. The zinc oxide content exceeds 99.5%. The carbon content is 0.2-1.0 wt. %. The BET specific surface area is 20-25 $m^2/g$.
Table 1 Solid components investigated.

cess of silanization involving trimethoxyoctylsilane. Thus, the purity and specific surface area are essentially the same for these two types of zinc oxide.

A type of fumed alumina used in this study is product Aeroxide ALU C from Degussa AG (Hanau, Germany). It is hereby referred to as "fumed alumina 2". It is aluminum oxide with average particle size 13 nm, BET specific surface area 100±15 $m^2/g$, $Al_2O_3$ content at least 96 wt. %, and carbon content in the range from 3.0 to 4.5 wt. %. The Aeroxide ALU C 805 (hereby referred to as "fumed alumina with silane coating") supplied by Degussa in this study was made from fumed alumina 2 by surface treatment with trimethoxyoctylsilane.

Another type of fumed alumina used is product SpectrAl 51 from Cabot Corp. (Billerica, Mass.). It is hereby referred to as "fumed alumina 1". It is in the form of nanoparticles with BET specific surface area 55 $m^2/g$ and $Al_2O_3$ content exceeding 99.8 wt. %.

The fumed titanium dioxide used is product Aeroxide $TiO_2$ P 25 from Degussa AG (Hanau, Germany), with primary particle size 21 nm, BET specific surface area 50±15 $m^2/g$, $TiO_2$ content at least 99.50 wt. %, $Al_2O_3$ content at or below 0.300 wt. %, $SiO_2$ content at or below 0.200 wt. %, $Fe_2O_3$ content at or below 0.010 wt. %, and HCl content at or below 0.300 wt. %.

In order to understand the effect of the particle morphology, the following non-fumed oxides are included in this study: zinc oxide nanoparticles ZANO 30 (Umicore Zinc Chemicals, Angleur, Belgium; hereby referred to as "non-fumed zinc oxide 1"), submicon zinc oxide particles Kadox 930 (Zinc Corporation of America, Monaca, Pa.; hereby referred to as non-fumed zinc oxide 2"), alumina nanoparticles M300 (Metlab Corporation, Niagara Falls, N.Y.; hereby referred to as "non-fumed alumina 1") and micron-sized alumina particles WCA (Mico Abrasives Corporation, Westfield, Mass.; hereby referred to as "non-fumed alumina 2").

For the sake of comparison, this study includes carbon black. The carbon black is a type for electrical conductivity and easy dispersion (Vulcan XC72R GP-3820; Cabot Corp., Billerica, Mass.). It consists of porous agglomerates of car-

TABLE 1

Solid components investigated.

| Description | Commercial designation | Composition/ morphology | Particle size | Surface treatment | Source |
| --- | --- | --- | --- | --- | --- |
| Carbon black | XC72R | Carbon black | 30 nm | None | Cabot |
| Fumed alumina 1 | SpectrAl 51 | $Al_2O_3$ (fumed) | — | None | Cabot |
| Fumed alumina 2 | ALU C | $Al_2O_3$ (fumed) | 13 nm | None | Degussa |
| Fumed alumina with silane coating | ALU C805 | $Al_2O_3$ (fumed) | 13 nm | Silane coated | Degussa |
| Non-fumed alumina 1 | M300 | $\gamma$-$Al_2O_3$ | 50 nm | None | Metlab Corp. |
| Non-fumed alumina 2 | WCA | $\alpha$-$Al_2O_3$ | 3.2 μm | None | Mico Abrasives Corp. |
| Fumed zinc oxide | ZnO 20 | ZnO (fumed) | 25 nm | None | Degussa |
| Fumed zinc oxide with silane coating | Z 805 | ZnO (fumed) | 25 nm | Silane coated | Degussa |
| Non-fumed zinc oxide 1 | ZANO 30 | ZnO | 30 nm | None | Umicore |
| Non-fumed zinc oxide 2 | Kadox 930 | ZnO | 0.33 μm | None | Zinc Corp. of America |
| Titanium dioxide | $TiO_2$ P25 | $TiO_2$ (fumed) | 21 nm | None | Degussa |

Another from of fumed zinc oxide used is product VP AdNano ZnO 20 from Degussa AG (Hanau, Germany). It is hereby referred to as "fumed zinc oxide". It is a hydrophilic zinc oxide. The fumed zinc oxide Z805 mentioned above is made from this material in a continuous post-treatment probon particles of particle size 30 nm, density 1.7-1.9 $g/cm^3$, nitrogen specific surface area 254 $m^2/g$ and maximum ash content 0.2%. It is used in the amount of 2.4 vol. %, which is the optimized amount used in the prior art (U.S. patent application Ser. No. 11/427,150 (2006)).

The morphology of the various oxide solid components is shown by the scanning electron microscope (SEM) micrographs in FIG. 1. The fumed oxides exhibit a fluffy porous agglomerate structure, whether the oxide is alumina (FIG. 1(a), 1(b) and 1(c)) or zinc oxide (FIG. 1(e) and 1(f)).

The vehicle consists of polyol esters, which are attractive for their ability to resist elevated temperatures. The polyol esters in the vehicle are pentaerythritol ester of linear and branched fatty acids and dipentaerythritol ester of linear and branched fatty acids. The polyol ester mixture is Hatcol 2372, as provided by Hatco Corp., Fords, N.J. (U.S. patent application Ser. No. 11/427,150 (2006)). The specific gravity is 0.97. No solute is used.

All the pastes in this work, regardless of the type of solid component, are prepared by ultrasonic dispersion for 10 min (min=minutes) with a certain amount of acetone as the solvent, followed by placing the paste in a vacuum chamber (which involves a mechanical vacuum pump) at 70° C. for 24 h (h=hours) for the purpose of solvent removal. Acetone is used as solvent because it greatly reduces the viscosity of the pastes and can be evaporated fast. The uniformity of the mixing is indicated by the consistency of the testing data obtained from various specimens from the same batch of paste.

For the sake of comparison, this study also includes commercial thermal pastes, namely Shin-Etsu X-23-7762 (aluminum particle filled silicone from Shin-Etsu MicroSi, Inc., Phoenix, Ariz., with density 2.6 g/ml and thermal conductivity 6.0 W/m·K) and Ceramique (density 2.7-2.8 g/ml, in the form of oils containing aluminum oxide, boron nitride and zinc oxide submicron particles, but without metal particles, from Arctic Silver Inc., Visalia, Calif.).

Example 2

Thermal Contact Conductance Measurement

This example pertains to testing the effectiveness of various thermal interface materials for improving a thermal contact by measuring the thermal contact conductance across copper surfaces using a steady-state method.

A steady-state method known as the Guarded Hot Plate Method (ASTM Method D5470) is used to measure the thermal contact conductance for various thermal contacts. Various thermal pastes are sandwiched between the 1×1 inch (25×25 mm) proximate surfaces of two copper blocks (both 1×1 inch surfaces of each block having a controlled degree of roughness). Each copper block has a height of 35 mm.

Figure 2:
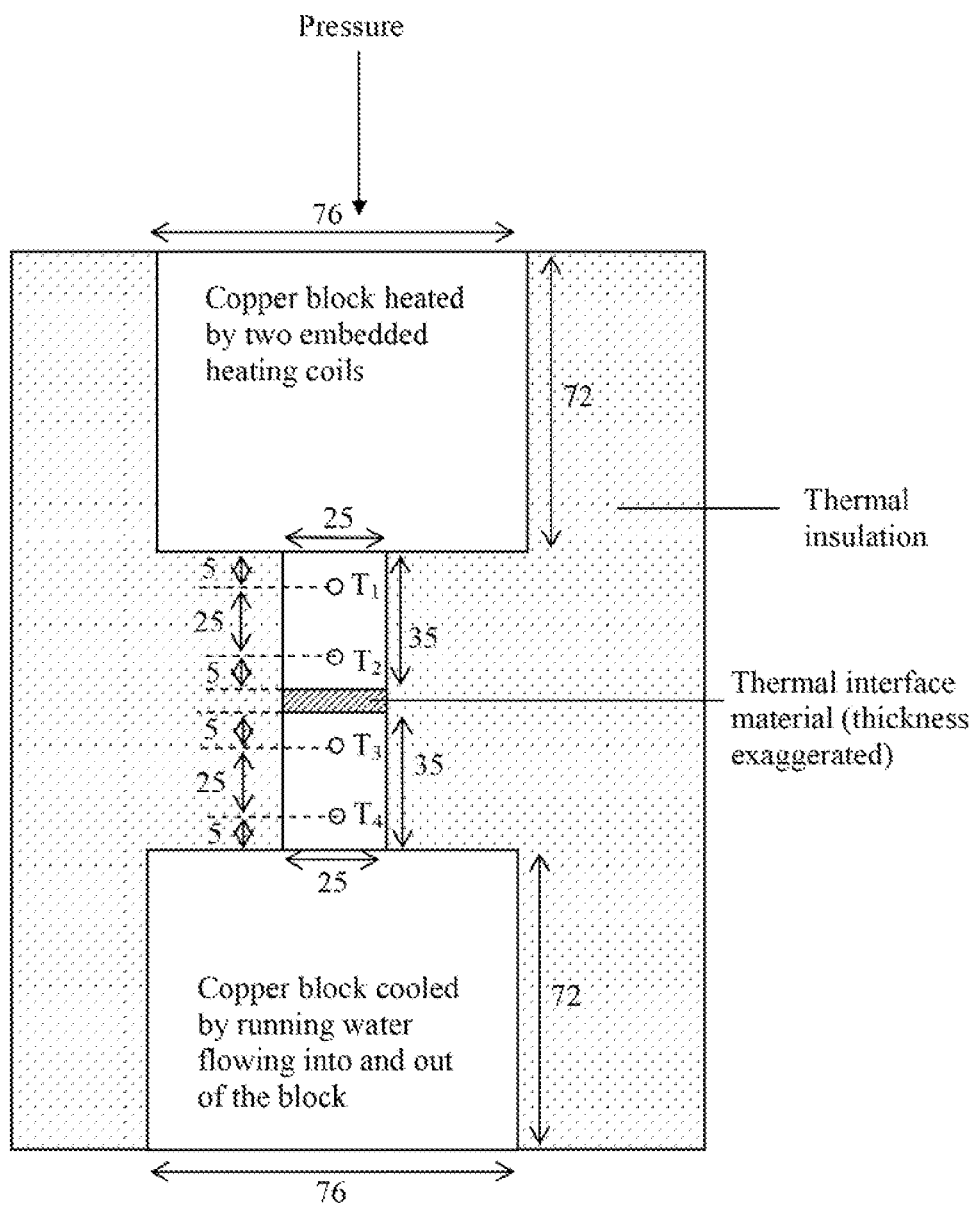
FIG. 2 is a schematic representation of the steady-state method (Guarded Hot Plate Method) of thermal contact conductance measurement. In this test, the thermal interface material under evaluation is sandwiched by two copper surfaces. $T_1$, $T_2$, $T_3$ and $T_4$ are holes of diameter 2.4 mm. A thermocouple (Type T) is inserted in each hole. All dimensions are in mm.

The heat in this test is provided by a 3×3 inch (76×76 mm) copper block that has two embedded heating coils (top block in FIG. 2). During the period of temperature rise, the heating rate is controlled at 3.2° C./min by using a temperature controller. This copper block is in contact with one of the 1×1 inch copper blocks that sandwich the thermal interface material. The cooling in this test is provided by a second 3×3 inch copper block, which is cooled by running water that flowed into and out of the block (bottom block in FIG. 1). This block is in contact with the other of the two 1×1 inch copper blocks that sandwich the thermal paste. The two mating surfaces of the two 1×1 in copper blocks are either "rough" (15 μm roughness, as attained by mechanical polishing) or "smooth" (0.009 μm roughness and 0.040-0.116 μm flatness, as attained by diamond turning). A 100-Ω resistance temperature detector (RTD) probe is inserted in four holes ($T_1$, $T_2$, $T_3$ and $T_4$ in FIG. 2, each hole of diameter 3.2 mm). Two of the four holes are in each of the 1×1 inch copper blocks. The temperature gradient is determined from $T_1$-$T_2$ and $T_3$-$T_4$. These two quantities should be equal at equilibrium, which is attained after holding the temperature of the heater at the desired value for 30 min. Equilibrium is assumed when the temperature variation is within +0.1° C. in a period of 15 min. At equilibrium, the temperature of the hot block is in the range 70-80° C., that of the cold block is in the range 40-60° C., while that of the thermal paste is in the range 60-70° C. The pressure in the direction perpendicular to the plane of the thermal interface is controlled by using a hydraulic press. The pressures used are 0.46, 0.69 and 0.92 MPa. The system is thermally insulated by wrapping laterally all the copper blocks with glass fiber cloth.

In accordance with ASTM Method D5470, the heat flow Q is given by $$Q = \frac{\lambda A}{d_A}\Delta T \tag{2}$$

where $\Delta T = T_1 - T_2 = T_3 - T_4$, $\lambda$ is the thermal conductivity of copper, A is the area of the 1×1 in copper block, and $d_A$ is the distance between thermocouples $T_1$ and $T_2$ (i.e., 25 mm).

The temperature at the top surface of the thermal interface material is $T_A$, which is given by $$T_A = T_2 - \frac{d_B}{d_A}(T_1 - T_2), \tag{3}$$

where $d_B$ is the distance between thermocouple $T_2$ and the top surface of the thermal interface material (i.e., 5 mm). The temperature at the bottom surface of the thermal interface material is $T_D$, which is given by $$T_D = T_3 - \frac{d_P}{d_C}(T_3 - T_4), \tag{4}$$

where $d_D$ is the distance between thermocouple $T_3$ and the bottom surface of the thermal interface material (i.e., 5 mm) and $d_C$ is the distance between thermocouples $T_3$ and $T_4$ (i.e., 25 mm).

The thermal resistivity θ is given by $$\theta = (T_A - T_D)\frac{A}{Q} \quad (5)$$

Note that insertion of Eq. (2) into Eq. (5) causes cancellation of the term A, so that θ is independent of A. The thermal contact conductance is the reciprocal of θ.

Example 3

Bond-Line Thickness Measurement

The bond-line thickness refers to the thickness of the thermal interface material. This quantity is relevant to the spreadability of the interface material. For a given pressure applied in the direction perpendicular to the plane of the thermal contact, a low value of the bond-line thickness is associated with high spreadability of the thermal paste.

Figure 3:
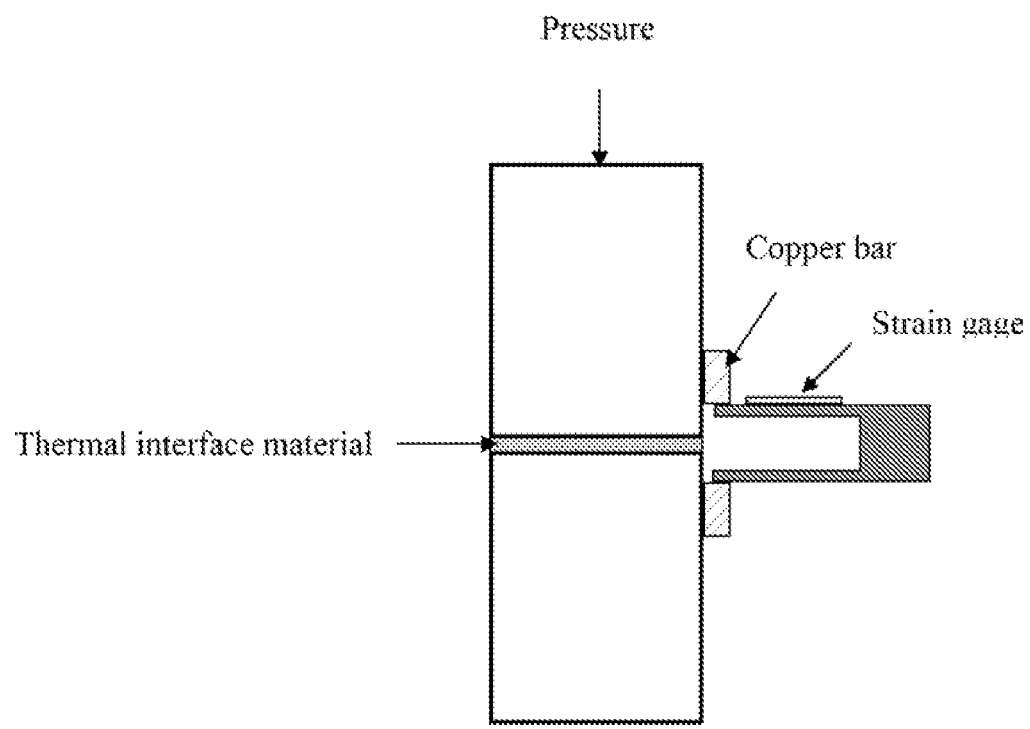
FIG. 3 is a schematic representation of the bond-line thickness measurement method. This thickness refers to the thickness of the thermal interface material when it is used to improve a thermal contact.

The bond-line thickness is measured by sandwiching the thermal paste at a pressure of 0.46 MPa with the "rough" copper blocks used for thermal contact conductance measurement. A strain gage mounted between the surfaces that sandwich the thermal interface material, as shown in FIG. 3, is used for the bond-line thickness measurement. The strain gage works by sensing the deformation induced by the distance change between the two mating surfaces. The bond-line thickness is calculated from the electrical output of the strain gage. The measurement is conducted at room temperature to avoid experimental error associated with the thermal expansion of the copper blocks and of the strain gage. The accuracy of this testing method is verified by the testing of copper foils of thickness 15 μm and 25 μm, which show an error of 15% in the thickness measurement.

Example 4

Thermal Stability Testing

It is necessary for a thermal paste to be able to resist the elevated temperatures involved in the particular application environment. The thermal stability refers to the ability to resist elevated temperatures. The thermal stability is commonly tested by measurement of the weight loss due to heating. The higher is the thermal stability, the less is the weight loss. A lower fractional loss in weight corresponds to a greater fractional residual weight.

The thermal stability is evaluated by measurement of the weight loss due to heating in air in a furnace at 200° C. for 24 h. The specimens are contained in aluminum weighing dishes. Three specimens of each type are tested. The heating rate and cooling rate are 3° C./min.

Example 5

Viscosity Measurement

The viscosity describes the resistance to shear deformation. It is a commonly used attribute for describing the behavior of pastes.

The viscosity of various pastes is measured by using a viscometer (Brookfield Engineering Laboratories, Inc., Middleboro, Mass., Model LVT Dial-Reading Viscometer, with Model SSA-18/13R Small Sample Adaptor). In addition, the viscometer is used to measure and the thixotropic index, as explained below.

Thixotropy refers to the rheological behavior in which a material flows only under a stress. An example of a thixotropic paste is Ketchup. The thixotropic index is a time dependent Theological property that describes the extent of thixotropic behavior. A range of rotational speeds are selected. The apparent viscosity is measured while the shear rate is progressively increased to the maximum and then progressively decreased to the minimum at constant time intervals. After the last viscosity measurement, the viscometer is turned off for 10 min. After this rest period, a measurement of the viscosity at the lowest rate is taken again. Two methods can be used to calculate the thixotropic index. Method A is the ratio of the increasing speed viscosity to that of the decreasing speed viscosity. Method B is the ratio of the lowest speed viscosity taken after the rest period to that before the rest period. The higher either ratio is, the greater is the thixotropy.

Example 6

Phase Separation Testing

Commercial thermal pastes are commonly packaged in syringes to enable dispensing of the material onto a working surface. The shelf life of the paste in the package depends on the tendency for phase separation. To test the tendency for phase separation, the pastes under study are stored in glass vials (1 dram or ⅛ oz each) at 100° C. for a period of 24 h, after which they are checked for the occurrence of phase separation by visual inspection. The pastes studied contain 4.0 vol. % filler, except fumed alumina 2 and fumed alumina with silane coating, which are at 2.4 vol. %.

Example 7

Evaluation of Thermal Contact Conductance and Bond-Line Thickness for Thermal Pastes This example pertains to evaluation of various thermal interface materials in terms of the thermal contact conductance and bond-line thickness across copper surfaces. The data that describe the performance of the interface materials are given in this example. The thermal interface materials evaluated include those formulated in this work as well as commercial thermal interface materials. The testing uses the methods described in Examples 2 and 3.

TABLE 2

Thermal conductance and bond-line thickness of various thermal pastes. Negative values of the bond-line thickness are due to the error in measuring small thickness values.

| Line No. | Solid component Type | Vol. % | Thermal contact conductance ($10^4$ W/m² · ° C.) Rough surfaces | | | Smooth surfaces | | Thickness (μm) |
|---|---|---|---|---|---|---|---|---|
| | | | 0.46 MPa | 0.69 MPa | 0.92 MPa | 0.46 MPa | 0.69 MPa | 0.46 MPa |
| 1 | Carbon black | 2.4 | 9.70 ± 0.11 | 10.23 ± 0.11 | 11.79 ± 0.27 | 25.91 ± 0.16 | 27.75 ± 0.14 | −1.4 ± 2.6 |
| 2 | Fumed alumina 1 | 4.0 | 8.36 ± 0.11 | 8.54 ± 0.19 | 9.00 ± 0.06 | | | |

TABLE 2-continued

Thermal conductance and bond-line thickness of various thermal pastes.
Negative values of the bond-line thickness are due to the error in measuring small thickness values.

| Line No. | Solid component Type | Vol. % | Thermal contact conductance ($10^4$ W/m$^2$ · °C.) | | | | | Thickness (μm) |
| | | | Rough surfaces | | | Smooth surfaces | | |
| | | | 0.46 MPa | 0.69 MPa | 0.92 MPa | 0.46 MPa | 0.69 MPa | 0.46 MPa |
|---|---|---|---|---|---|---|---|---|
| 3 | Fumed alumina 2 | 4.0 | 6.92 ± 0.29 | 7.80 ± 0.21 | 8.03 ± 0.29 | / | / | / |
| 4 | Fumed alumina | 1.2 | 9.69 ± 0.18 | 10.00 ± 0.19 | 10.13 ± 0.10 | / | / | / |
| 5 | with silane | 2.4 | 10.00 ± 0.24 | 10.55 ± 0.28 | 10.52 ± 0.27 | 25.13 ± 0.76 | 27.76 ± 0.25 | −2.0 ± 3.4 |
| 6 | coating | 4.0 | 8.70 ± 0.12 | 9.42 ± 0.07 | 9.41 ± 0.04 | / | / | / |
| 7 | | 6.0 | 8.17 ± 0.12 | 8.32 ± 0.19 | 8.43 ± 0.12 | / | / | / |
| 8 | | 10.0 | 7.16 ± 0.10 | 7.34 ± 0.07 | 7.10 ± 0.11 | / | / | 3.8 ± 2.2 |
| 9 | Non-fumed alumina 1 | 4.0 | 3.15 ± 0.03 | / | / | / | / | / |
| 10 | Non-fumed alumina 2 | 4.0 | 1.41 ± 0.01 | / | / | / | / | / |
| 11 | Fumed zinc oxide | 2.4 | 5.44 ± 0.04 | 6.10 ± 0.18 | 6.75 ± 0.10 | / | / | / |
| 12 | | 4.0 | 6.28 ± 0.11 | 6.59 ± 0.14 | 6.87 ± 0.20 | / | / | / |
| 13 | Fumed zinc oxide | 2.4 | 10.01 ± 0.29 | 10.66 ± 0.12 | 11.02 ± 0.09 | / | / | / |
| 14 | with silane | 4.0 | 10.10 ± 0.20 | 10.80 ± 0.22 | 11.12 ± 0.26 | 20.30 ± 0.17 | 25.22 ± 0.87 | −0.8 ± 1.8 |
| 15 | coating | 6.0 | 9.25 ± 0.11 | 9.54 ± 0.15 | 9.74 ± 0.13 | / | / | / |
| 16 | | 10.0 | 9.10 ± 0.15 | 9.47 ± 0.39 | 9.61 ± 0.64 | / | / | / |
| 17 | | 16.0 | 9.19 ± 0.07 | 9.42 ± 0.10 | 9.66 ± 0.13 | 18.95 ± 0.28 | 21.65 ± 0.11 | 3.3 ± 0.8 |
| 18 | | 20.0 | 8.55 ± 0.17 | 9.51 ± 0.02 | 9.68 ± 0.06 | / | / | / |
| 19 | | 30.0 | 2.97 ± 0.04 | / | / | / | / | 22.4 ± 4.4 |
| 20 | Non-fumed zinc oxide 1 | 2.4 | 6.57 ± 0.08 | 6.89 ± 0.07 | 7.67 ± 0.17 | / | / | / |
| 21 | | 4.0 | 6.32 ± 0.10 | 6.89 ± 0.05 | 7.12 ± 0.08 | 17.02 ± 0.14 | 19.98 ± 0.15 | / |
| 22 | | 6.0 | 5.65 ± 0.05 | 5.96 ± 0.03 | 6.69 ± 0.08 | / | / | / |
| 23 | Non-fumed zinc oxide 2 | 4.0 | 7.89 ± 0.15 | 8.10 ± 0.04 | 8.51 ± 0.17 | 15.34 ± 0.14 | 16.90 ± 0.44 | / |
| 24 | Titanium dioxide | 4.0 | 6.12 ± 0.12 | 6.33 ± 0.06 | 6.61 ± 0.02 | / | / | / |
| 25 | None | 0.0 | 10.50 ± 0.60 | 10.70 ± 0.10 | 11.30 ± 0.20 | 28.79 ± 0.16 | 32.72 ± 1.62 | / |
| 26 | Ceramique [9] | | 7.21 ± 0.10 | 8.47 ± 0.53 | 9.92 ± 0.41 | 21.48 ± 1.12 | 24.10 ± 0.76 | / |
| 27 | Shin-Etsu | | 7.76 ± 0.14 | 8.43 ± 0.20 | 8.78 ± 0.11 | 19.87 ± 0.27 | 22.55 ± 0.43 | 27.3 ± 5.2 |

Table 2 gives the thermal contact conductance and bond-line thickness of all the pastes studied. In the case of alumina pastes with 4.0 vol. % fillers, fumed alumina 1, fumed alumina 2 and fumed alumina with silane coating are more effective than non-fumed alumina 1 and non-fumed alumina 2 as thermally conductive fillers. This result can be explained by the fluffiness of the fumed oxides and the consequent ability to be compressed and hence conform to the topography of the surfaces. These squishable fillers have a similar structure as carbon black. The superiority of the fumed form (with silane coating) compared to the non-fumed zinc oxide form 1 and 2 is also observed for pastes containing 4.0 vol. % zinc oxide. However, the uncoated fumed zinc oxide does not show superiority over non-fumed zinc oxide 1 or non-fumed zinc oxide 2. This may be caused by the fact that the fumed zinc oxide studied is designed for hydrophilic applications, thus making its dispersion in the vehicle, which is an oil, difficult.

Comparison of the results for fumed alumina 2 (not coated, Line 3) and fumed alumina with coating (treated by octylsilane, Line 6) shows that the coating helps the thermal conductance. The positive effect of the silane coating is even stronger for zinc oxide (Lines 11 and 13 in comparison, and Lines 12 and 14 in comparison). This is due to the silane coating improving the interface between the oxide solid component and the matrix, since the layer of silane changes the particle surface from being hydrophilic to being hydrophobic. The surface treatment may also reduce the interaction between particles and decrease the size and reduce the amount of particle agglomerates, which will lead to a smaller bond-line thickness of the pastes.

According to Eq. (6), a smaller bond-line thickness will give a lower thermal resistance, which means a higher thermal conductance.

$$R = t/k + R_1 + R_2 \qquad (6)$$

where t is the bond-line thickness of the thermal interface material, k is the thermal conductivity of the thermal interface material, R is the total thermal resistance, and $R_1$ and $R_2$ are the thermal resistances of the interface between the thermal interface material and the two surfaces that sandwich the interface material.

The silane treatment also results in a lower viscosity of the paste (Example 8). The lower viscosity facilitates the filling of the valleys associated with the topography of the mating surfaces. A better interface between the paste and the mating surface can reduce the contact resistance, thus resulting in a lower value of the total thermal resistance, as shown by Eq. (6).

The optimized composition of the silane coated fumed alumina paste is 2.4 vol. % filler, with 97.6 vol. % vehicle, as this gives the highest conductance, at least for the case of the rough surfaces. The optimized composition of the fumed zinc oxide with silane coating paste is 4.0 vol. % filler, with 96 vol. % vehicle. Both of these optimized pastes have essentially thermal conductance values that are higher than those of commercial products, namely Ceramique and Shin-Etsu. For the case of smooth surfaces, the optimized pastes are also more effective than the two commercial products.

Comparison of the optimized fumed oxide pastes (2.4 vol. % silane coated fumed alumina and 4.0 vol. % silane coated fumed zinc oxide) with the commercial Shin-Etsu product shows that the bond-line thicknesses of the two pastes are much lower than that of Shin-Etsu. This explains why the thermal contact conductance of Shin-Etsu is lower than the optimized fumed oxide pastes, though it has a high thermal conductivity of 6.0 W/m·K, as reported by Shin-Etsu.

Table 2 shows that fumed titanium dioxide is not as effective as fumed alumina or fumed zinc oxide. This is probably because of its relatively low thermal conductivity (6.69 W/m·K) and its hydrophilic surface condition, which leads to poor dispersion.

For the vehicle in the absence of a solid component (Line 25 of Table 2), the thermal contact conductance is higher than any of the other cases in the table, whether the mating surfaces are rough or smooth. In other words, the addition of any of the solid components causes the thermal contact conductance to decrease, although it tends to increase the thermal conductivity within the thermal interface material. This is believed to be due to the very low bond-line thickness attained when there is no solid component. On the other hand, the viscosity is very low in the absence of a solid component (Example 8). A very low viscosity is undesirable in relation to the tendency for seepage and the difficulty of footprint control during application.

Example 8

Evaluation of Viscosity

Figure 4:
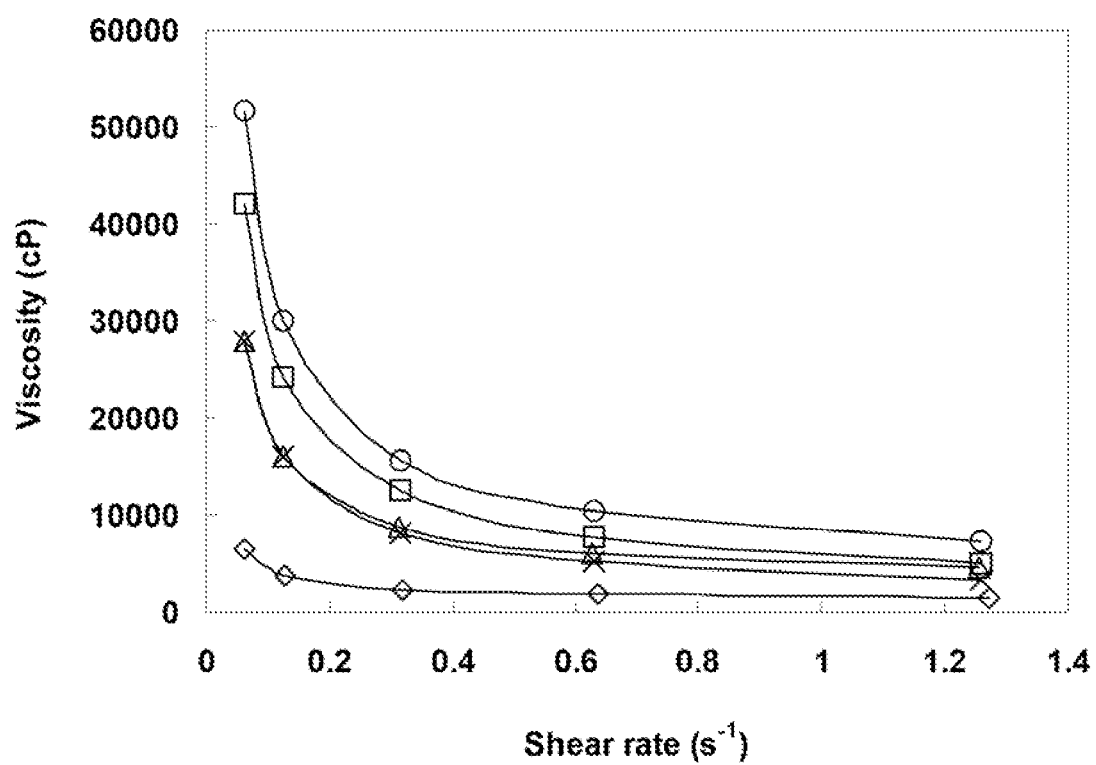
FIG. 4 shows the effect of shear rate on the viscosity for pastes with various fumed oxides and for the vehicle by itself. □: 4 vol. % fumed zinc oxide; ∆: 4 vol. % fumed zinc oxide with silane coating: ○: 2.4 vol. % fumed alumina 2; ×: 2.4 vol. % fumed alumina with silane coating; ◇: 100% vehicle.

The viscosity of selected pastes and the unfilled vehicle are shown in FIG. 4. The presence of a solid component (filler), whichever type, increases the viscosity. At the same solid component content of 2.4 vol. %, fumed alumina 2 gives much higher viscosity than the silane coated fumed alumina, probably because the silane coating decreases the interaction between the alumina aggregates, thereby decreasing the shear stress required to break the flocculation. A similar effect of silane coating is observed for the zinc oxide paste. A lower viscosity is expected to increase the spreadability, hence decreasing the thermal resistance, as explained in Example 7.

TABLE 3

Shear thinning index and thixotropic index of selected thermal pastes

| Solid component | Shear thinning index | Thixotropic index Method A | Thixotropic index Method B |
|---|---|---|---|
| None | 3.44 | 1.35 | 1.35 |
| 4 vol. % fumed zinc oxides with silane coating | 4.66 | 0.78 | 0.89 |
| 4 vol. % fumed zinc oxide | 5.44 | 0.91 | 0.91 |
| 2.4 vol. % fumed alumina with silane coating | 5.47 | 0.95 | 0.92 |
| 2.4 vol. % fumed alumina 2 | 4.90 | 0.99 | 0.93 |

The thixotropic index, as shown in Table 3, decreases in the presence of a solid component. This behavior is associated with a slow recovery process after the application of shear, although the breakdown upon shear is rapid. Table 3 shows that the thixotropic index determined by using Method A is comparable to that determined by Method B. Table 3 also shows that adding fumed oxides increases the shear-thinning index. Shear thinning (i.e., the decrease of viscosity with increasing shear rate) can be attributed to the particles becoming more aligned and hence less entangled and less resistant to deformation as the shear rate is increased.

TABLE 4

Fitted equation and derived rheological parameters of selected thermal pastes

| Solid component | Fitted equation | $R^2$* | n | K |
|---|---|---|---|---|
| None | $\log \eta = -0.48 \log \dot{\gamma} + 3.18$ | 0.969 | 0.52 | 1502.45 |
| 4.0 vol. % fumed zinc oxide with silane coating | $\log \eta = -0.61 \log \dot{\gamma} + 3.67$ | 0.998 | 0.39 | 4716.29 |
| 4.0 vol. % fumed zinc oxide | $\log \eta = -0.71 \log \dot{\gamma} + 3.75$ | 0.998 | 0.29 | 5675.45 |
| 2.4 vol. % fumed alumina with silane coating | $\log \eta = -0.71 \log \dot{\gamma} + 3.57$ | 0.994 | 0.29 | 3749.73 |
| 2.4 vol. % fumed alumina 2 | $\log \eta = -0.66 \log \dot{\gamma} + 3.90$ | 0.987 | 0.34 | 7912.25 |

*$R^2$ (R-squared value, also known as the coefficient of determination) is a statistical measure of how well a regression line approximates the real data points. The closer it is to one, the greater is the ability of the fitted equation to predict the linear trend.

Some filled polymer systems can be modeled as power law fluids. A simple calculation based on the viscosity data in FIG. 4 and using Eq. (7) below shows that the thermal pastes studied obey the power law fluids model.

$$\eta = K(\dot{\gamma})^{n-1} \quad (7)$$

Figure 5:
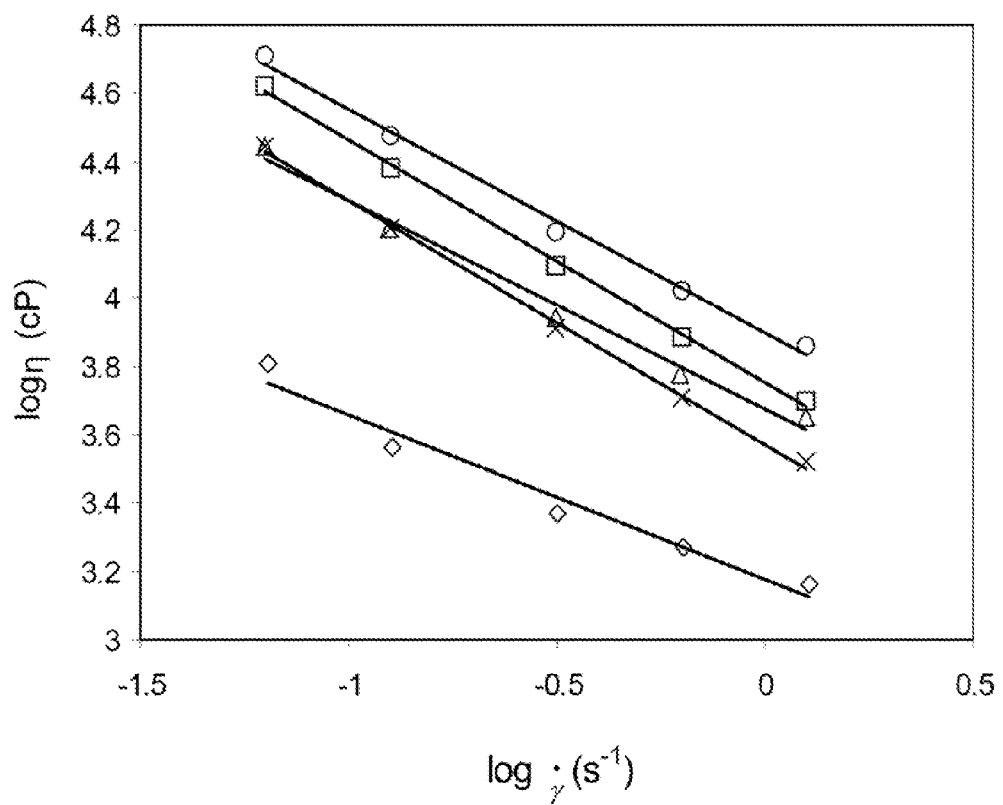
FIG. 5 shows the power-law model fitting of the dependence of the viscosity on the shear strain rate for pastes with and without a solid component (fumed alumina or fumed zinc oxide) and for the vehicle by itself. □: 4 vol. % fumed zinc oxide; ∆: 4 vol. % fumed zinc oxide with silane coating: ○: 2.4 vol. % fumed alumina 2; ×: 2.4 vol. % fumed alumina with silane coating; ◇: 100% vehicle.

In Eq. (7), K is the consistency index, n is power law index and $\dot{\gamma}$ is the strain rate. FIG. 5 shows a linear relationship in the plot of log $\eta$ vs. log $\dot{\gamma}$ for all types of thermal pastes studied. The fitted equations and the derived rheological parameters, n and K, are listed in Table 4. The rheological parameter K reflects the consistency of the filled polymer, with higher values representative of more viscous materials. The rheological parameter n is the power-law index that gives a measure of the pseudo-plasticity, with greater departures from unity corresponding to more pronounced shear-thinning behavior. This means that the results of the power-law model fitting are consistent with the trend in the viscosity (FIG. 4) and with the trend in the shear thinning index (Table 3).

Example 9

Evaluation of Thermal Stability

The thermal stability testing results, as shown in Table 5, are expressed in terms of the fractional residual weight including the solid component and that excluding the solid component. The latter is more indicative of the thermal stability of the liquid in the paste, whereas the former includes the effect of the filler volume fraction.

TABLE 5

Thermal stability of various thermal pastes, as shown by the residual mass after heating, with the mass of the solid component either excluded or included.

| Line No. | Solid component | Solid component vol. % | Vehicle vol. % | Residual wt. % Excluding the solid component | Residual wt. % Including the solid component |
|---|---|---|---|---|---|
| 1 | None | 0 | 100 | 31.2 ± 1.0 | 31.2 ± 0.7 |
| 2 | Fumed alumina 1 | 4.0 | 96.0 | 31.4 ± 0.6 | 20.8 ± 0.7 |
| 3 | Fumed alumina 2 | 4.0 | 96.0 | 27.7 ± 1.8 | 18.7 ± 2.0 |
| 4 | Fumed alumina with silane coating | 4.0 | 96.0 | 45.3 ± 1.3 | 39.1 ± 1.4 |
| 5 | Fumed alumina with silane coating | 10.0 | 90.0 | 45.9 ± 0.7 | 29.8 ± 0.7 |
| 6 | Non-fumed alumina 1 | 4.0 | 96.0 | 32.7 ± 0.5 | 22.3 ± 0.6 |
| 7 | Fumed zinc oxide | 4.0 | 96.0 | 59.4 ± 1.9 | 49.6 ± 2.3 |
| 8 | Fumed zinc oxide with silane coating | 4.0 | 96.0 | 67.6 ± 1.0 | 59.7 ± 1.2 |
| 9 | Fumed zinc oxide with silane coating | 16.0 | 84.0 | 81.6 ± 0.4 | 61.4 ± 0.8 |
| 10 | Non-fumed zinc oxide 1 | 4.0 | 96.0 | 55.9 ± 2.0 | 45.2 ± 2.4 |
| 11 | Non-fumed zinc oxide 2 | 4.0 | 96.0 | 59.7 ± 1.2 | 50.0 ± 1.5 |
| 12 | Titanium dioxide | 4.0 | 96.0 | 54.0 ± 1.2 | 47.0 ± 1.3 |

Comparison of Lines 1, 2, 3 and 6 shows that the presence of the alumina essentially does not affect the thermal stability calculated by excluding the solid component. All the three types of the alumina give similar results in thermal stability, though their morphology is different. Comparison of Lines 3 and 4 shows that the silane coating enhances the thermal stability, whether the fractional residual weight is calculated by including the solid component or not. Comparison of Lines 4 and 5 shows that increasing the volume fraction of fumed alumina (with silane coating) does not enhance the thermal stability.

Similarly, all the types of zinc oxide without surface treatment show almost the same thermal stability performance, though they have different morphologies and are from different sources. The silane coating also enhances the thermal stability of zinc oxide pastes, as shown by comparing Lines 7 and 8.

The origin of the effect of the silane coating on the thermal stability is presently unclear. However, it may be due to the layer of silane on the particle surface hindering the interaction of the surface with the vehicle.

Comparison of the pastes with alumina and those with zinc oxide shows that the latter exhibits better thermal stability performance. This is probably caused by the pH of the particles, since the pH value of alumina is 3.0-5.0, while zinc oxide is amphoteric, with its pH at 6.5-8.0.

Example 10

Evaluation of Phase Separation Tendency

Figure 6:
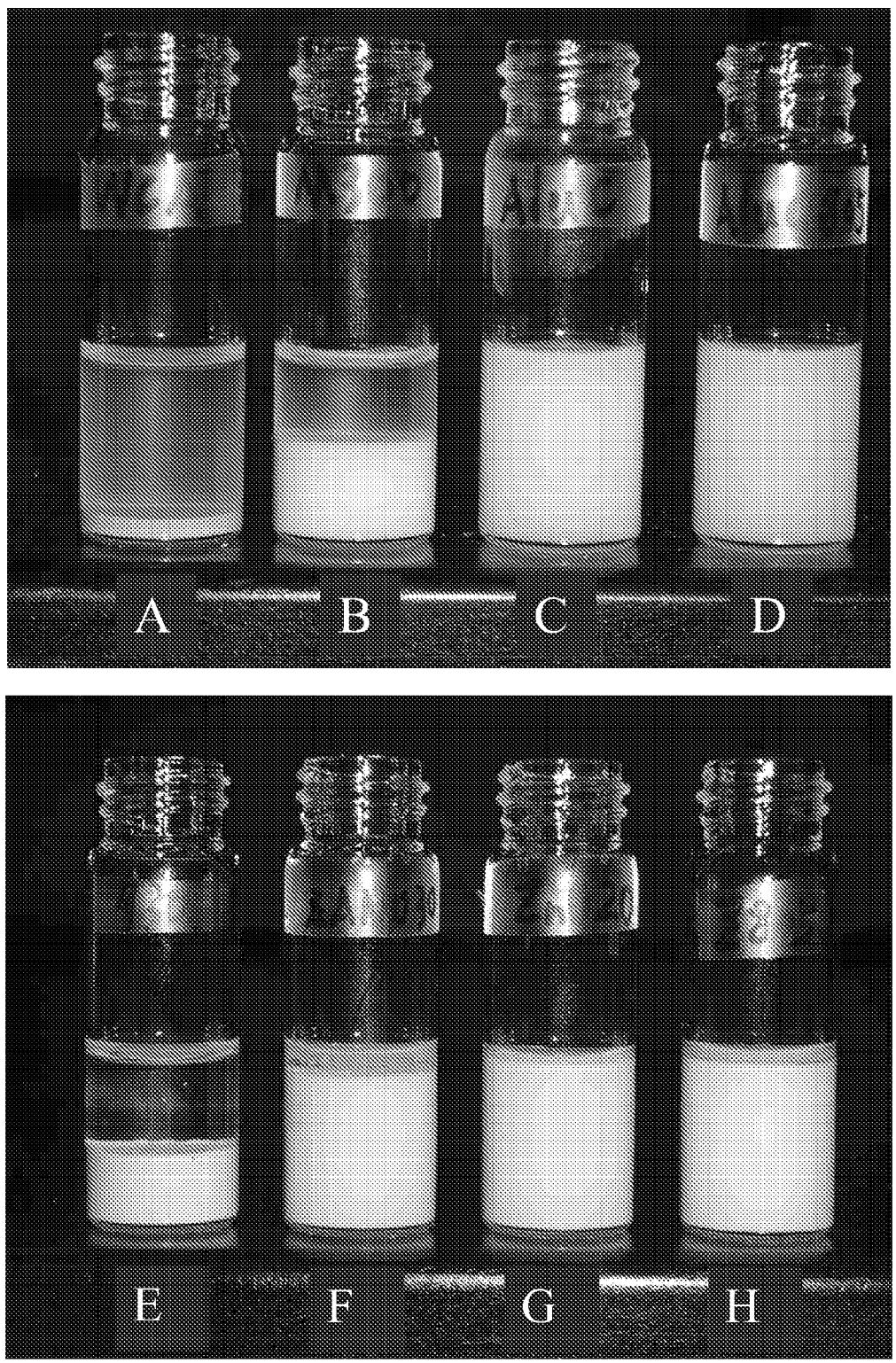
FIG. 6 shows the phase separation behavior of selected thermal pastes. A: 4.0 vol. % non-fumed alumina 2; B: 4.0 vol. % non-fumed alumina 1; C: 2.4 vol. % fumed alumina 2; D: 2.4 vol. % fumed alumina with silane coating; E: 4.0 vol. % non-fumed zinc oxide 2; F: 4.0 vol. % non-fumed zinc oxide 1; G: 4.0 vol. % fumed zinc oxide; H, 4.0 vol. % fumed zinc oxide with silane coating.

The photographs taken by a digital camera of the pastes after phase separation testing are shown in FIG. 6. Among the alumina pastes, the non-fumed alumina 1 paste (Sample A in FIG. 6) exhibits the most serious separation, and the non-fumed alumina 2 paste (Sample B) also shows quite serious separation, while the fumed alumina 2 paste (Sample C) and fumed alumina (with silane coating) paste (Sample D) do not show any observable separation. Among the zinc oxides pastes, both the non-fumed zinc oxide 2 paste (Sample E) and the non-fumed zinc oxide 1 paste (Sample F) suffer from serious phase separation, while pastes containing fumed zinc oxide with or without silane coating (Samples G and H) show slight phase separation. The higher tendency for separation for fumed zinc oxide than fumed alumina is mainly due to the relatively high density of zinc oxide. Increase of the volume fraction of the filler will diminish the phase separation; for example, there is no observable separation for the paste with 16.0 vol. % silane coated fumed zinc oxide (photo not shown here). The effectiveness of fumed oxides for enhancing the resistance to phase separation is due to their porous fluffy structure, which helps form a network and hold the vehicle.

In summary, nanostructured fumed oxides (aluminum oxide of particle size 13 nm and zinc oxide of particle size 20-25 nm) are highly effective as thermally conductive solid components in thermal pastes. They are as effective as carbon black of the prior art, but are advantageous in their electrical non-conductivity. Without fuming, the oxides are less effective. By coating (treating) with silane prior to use, both fumed alumina and fumed zinc oxide become even more effective. The silane coating (treatment) decreases the viscosity of the paste. The thixotropic index is decreased by the presence of an oxide as the solid component, while the shear thinning index is increased. The fumed titanium dioxide is less effective than alumina or zinc oxide (whether fumed or not).

The non-aqueous vehicle (polyol esters) and solid component content (2.4-4.0 vol. %) are chosen to allow the pastes to be highly conformable and spreadable. The spreadability results in a small bond-line thickness, which helps reduce the thermal resistance. Fumed oxide volume fractions beyond 4.0 vol. % give thermal pastes that are less effective, with lower values of the thermal contact conductance and higher values of the bond-line thickness.

The thermal contact conductance is relatively high when no solid component is present at all, i.e., when the vehicle is used alone. However, the associated viscosity is very low (i.e., the material is excessively fluid), causing difficulty in practical use. Furthermore, the thermal stability is relatively low.

The effectiveness of thermal pastes is evaluated by measuring the thermal contact conductance across copper mating surfaces of controlled roughness levels and at controlled pressures, using the Guarded Hot Plate Method. The use of either 4.0 vol. % silane coated fumed zinc oxide or 2.4 vol. % silane coated alumina in the polyol ester vehicle gives thermal pastes that are more effective than commercial thermal pastes (Ceramique and Shin-Etsu) when the mating surfaces have a surface roughness of 15 μm. These fumed oxide pastes are comparable to or more effective than these commercial thermal pastes when the mating surfaces have a surface roughness of 0.009 μm. The bond-line thickness at a pressure of 0.46 MPa is less than 3 μm for the oxide pastes, but is 27 μm for the commercial Shin-Etsu paste.

The residual weight (excluding the weight of the solid component) of the paste after heating at 200° C. for 24 h is increased from 31% in the absence of a solid component to 45% in the presence of 2.4 vol. % silane-coated fumed alumina, and to 68% in the presence of 4.0 vol. % silane-coated fumed zinc oxide. Fumed zinc oxide is superior to non-fumed zinc oxide in improving the thermal stability. Silane coating of the fumed zinc oxide further improves the thermal stability. Fumed alumina does not affect the thermal stability, but silane-coated fumed alumina improves the thermal stability.

Though silane-coated fumed zinc oxide is superior to silane-coated fumed alumina in enhancing the thermal stability, it is inferior in the phase separation tendency. Nevertheless, the phase separation tendency is low for both pastes.

Although preferred embodiments have been depicted and described in detail herein, it will be apparent to those skilled in the relevant art that various additions, substitutions, modifications and the like can be made without departing from the spirit of the invention and these are therefore considered to be within the scope of the invention as defined in the claims which follow.

What is claimed is:

1. A conformable, spreadable, electrically nonconductive, thermally conductive, thermally stable and phase separation resistant paste consisting substantially of fumed oxide dispersed in a non-aqueous paste-forming vehicle, said paste having a viscosity range to allow said fumed oxide to deform upon compression of said paste.

2. The paste of claim 1, wherein the fumed oxide is silane-treated.

3. The paste of claim 1, wherein the fumed oxide is selected from the group consisting of fumed zinc oxide, fumed alumina, fumed silica, fumed titanium oxide, fumed magnesium oxide, fumed nickel oxide, fumed copper oxide, fumed iron oxide, fumed cobalt oxide, fumed chromium oxide, fumed manganese oxide, fumed calcium oxide, fumed strontium oxide, fumed barium oxide, fumed germanium oxide and fumed tin oxide.

4. The paste of claim 1, wherein the amount of fumed oxide dispersed in the paste is less than about 10 vol. %.

5. The paste of claim 1, wherein the fumed oxide comprises particles of particle size less than about 500 nm.

6. The paste of claim 1, wherein the non-aqueous paste-forming vehicle is selected from the group consisting of polyol esters, polyols and polysiloxanes.

7. A thermal contact enhancing interface material comprising: a conformable, spreadable, electrically nonconductive, thermally conductive, thermally stable and phase separation resistant paste comprising fumed oxide dispersed in a paste-forming vehicle, wherein (a) the paste has a viscosity range to allow said fumed oxide to deform upon compression of the paste, and (b) the paste, upon compression between two solid surfaces, forms a material that enhances the thermal contact between said surfaces.

8. The thermal contact enhancing interface material of claim 7, wherein the fumed oxide is silane-treated.

9. The thermal contact enhancing interface material of claim 7, wherein the fumed oxide is chosen from the group: fumed zinc oxide, fumed alumina, fumed silica, fumed titanium oxide, fumed magnesium oxide, fumed nickel oxide, fumed copper oxide, fumed iron oxide, fumed cobalt oxide, fumed chromium oxide, fumed manganese oxide, fumed calcium oxide, fumed strontium oxide, fumed barium oxide, fumed germanium oxide, fumed tin oxide.

10. The thermal contact enhancing interface material of claim 7, wherein the amount of fumed oxide dispersed in the paste is less than about 10 vol. %.

11. The thermal contact enhancing interface material of claim 7, wherein the fumed oxide comprises particles of particle size less than about 500 nm.

12. The thermal contact enhancing interface material of claim 7, wherein the paste-forming vehicle is chosen from the group: polyol esters, polyols, polysiloxanes.

13. The thermal contact enhancing interface material of claim 7, wherein the two solid surfaces are compressed at a pressure less than about 5 MPa.

14. The thermal contact enhancing interface material of claim 7, wherein the paste, when compressed between said solid surfaces, is of thickness less than about 100 μm.

15. Method of providing a thermal contact between two solid surfaces, said method comprising:
   a. disposing between and in contact with said surfaces a material comprising: a conformable, spreadable, electrically nonconductive, thermally conductive, thermally stable and phase separation resistant paste comprising fumed oxide dispersed in a paste-forming vehicle, said paste having a viscosity range to allow said fumed oxide to deform upon compression of said paste and
   b. applying a pressure to cause said paste to conform to the topography of said surfaces.

16. Method of claim 15, wherein the fumed oxide is silane-treated.

17. Method of claim 15, wherein the fumed oxide is selected from the group consisting of fumed zinc oxide, fumed alumina, fumed silica, fumed titanium oxide, fumed magnesium oxide, fumed nickel oxide, fumed copper oxide, fumed iron oxide, fumed cobalt oxide, fumed chromium oxide, fumed manganese oxide, fumed calcium oxide, fumed strontium oxide, fumed barium oxide, fumed germanium oxide, fumed tin oxide.

18. Method of claim 15, wherein the amount of fumed oxide dispersed in the paste is less than about 10 vol %.

19. Method of claim 15, wherein the paste-forming vehicle is selected from the group consisting of polyol esters, polyols and polysiloxanes.

20. Method of claim 15, wherein the paste, when compressed between said solid surfaces, is of thickness less than about 100 μm.

* * * * *